US011734221B2

United States Patent
Nandlinger et al.

(10) Patent No.: US 11,734,221 B2
(45) Date of Patent: Aug. 22, 2023

(54) PROCESSING SYSTEM COMPRISING A QUEUED SERIAL PERIPHERAL INTERFACE, RELATED INTEGRATED CIRCUIT, DEVICE AND METHOD

(71) Applicants: STMicroelectronics Application GMBH, Aschheim-Dornach (DE); STMICROELECTRONICS DESIGN AND APPLICATION S.R.O., Prague (CZ)

(72) Inventors: Rolf Nandlinger, Herrsching (DE); Radek Olexa, Prague (CZ)

(73) Assignees: STMICROELECTRONICS APPLICATION GMBH, Aschheim-Dornach (DE); STMICROELECTRONICS DESIGN AND APPLICATION S.R.O., Prague (CZ)

( * ) Notice: Subject to any disclaimer, the term of this patent is extended or adjusted under 35 U.S.C. 154(b) by 98 days.

(21) Appl. No.: 17/199,418

(22) Filed: Mar. 11, 2021

(65) Prior Publication Data

US 2021/0303504 A1 Sep. 30, 2021

(30) Foreign Application Priority Data

Mar. 25, 2020 (IT) .................. 102020000006322

(51) Int. Cl.
*G06F 13/42* (2006.01)
*G06F 9/30* (2018.01)
(Continued)

(52) U.S. Cl.
CPC ...... *G06F 13/4291* (2013.01); *G06F 9/30134* (2013.01); *G06F 13/1673* (2013.01); *G06F 13/4031* (2013.01)

(58) Field of Classification Search
CPC ............. G06F 13/4291; G06F 9/30134; G06F 13/1673; G06F 13/4031
See application file for complete search history.

(56) References Cited

U.S. PATENT DOCUMENTS 5,805,922 A * 9/1998 Sim .................. G06F 13/385
710/52
6,157,968 A * 12/2000 Baruch .............. G06F 13/124
710/21

(Continued)

OTHER PUBLICATIONS

Intel, "Enhanced Serial Peripheral Interface (eSPI) Interface Base Specification (for Client and Server Platforms," Feb. 1, 2016, XP055683687, 130 pages.

(Continued)

*Primary Examiner* — Phong H Dang
(74) *Attorney, Agent, or Firm* — Slater Matsil, LLP

(57) ABSTRACT

An embodiment processing system comprises a queued SPI circuit, which comprises a hardware SPI communication interface, an arbiter and a plurality of interface circuits. Each interface circuit comprises a transmission FIFO memory, a reception FIFO memory and an interface control circuit. The interface control circuit is configured to receive first data packets and store them to the transmission FIFO memory. The interface control circuit sequentially reads the first data packets from the transmission FIFO memory, extracts at least one transmission data word, and provides the extracted word to the arbiter. The interface control circuit receives from the arbiter a reception data word and stores second data packets comprising the received reception data word to the reception FIFO memory. The interface control circuit sequentially reads the second data packets from the reception FIFO memory and transmits them to the digital processing circuit.

20 Claims, 22 Drawing Sheets

(51) Int. Cl.
    *G06F 13/16*     (2006.01)
    *G06F 13/40*     (2006.01)

(56) References Cited

U.S. PATENT DOCUMENTS

| | | | |
|---|---|---|---|
| 6,260,086 B1* | 7/2001 | Butler | G06F 13/124 |
| | | | 710/1 |
| 2002/0133662 A1* | 9/2002 | Cheung | G06F 13/385 |
| | | | 710/310 |
| 2010/0146157 A1 | 6/2010 | Choi et al. | |
| 2010/0185789 A1* | 7/2010 | Bond | G06F 13/385 |
| | | | 710/110 |
| 2012/0089754 A1* | 4/2012 | Su | G06F 13/128 |
| | | | 710/110 |
| 2013/0304947 A1* | 11/2013 | Wada | G06F 11/3048 |
| | | | 710/18 |
| 2016/0132440 A1 | 5/2016 | Casady et al. | |
| 2020/0341934 A1* | 10/2020 | Abdul Kalam | G06F 13/1673 |
| 2021/0109886 A1* | 4/2021 | Vaarlid | G06F 13/4291 |

OTHER PUBLICATIONS

Tang, K., "AURIX 2G Queued Serial Peripheral Interface(QSPI) Overview," INFINEON, May 2, 2018, 43 pages.

* cited by examiner

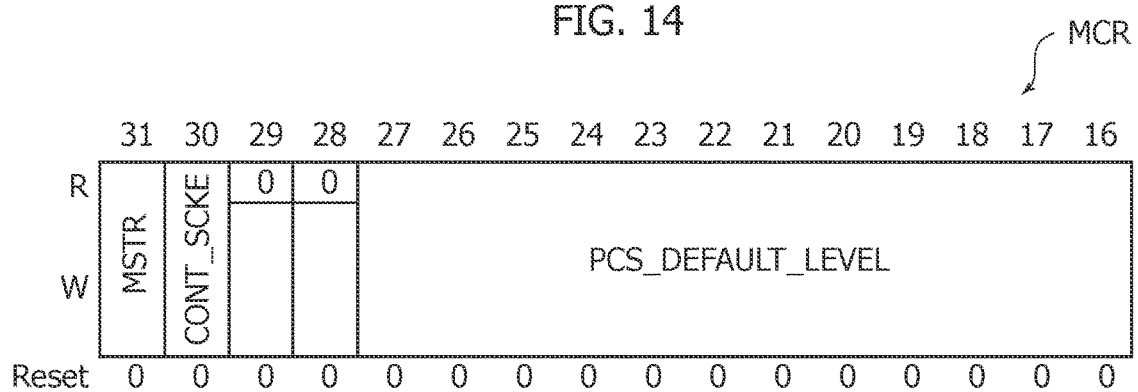
FIG. 14
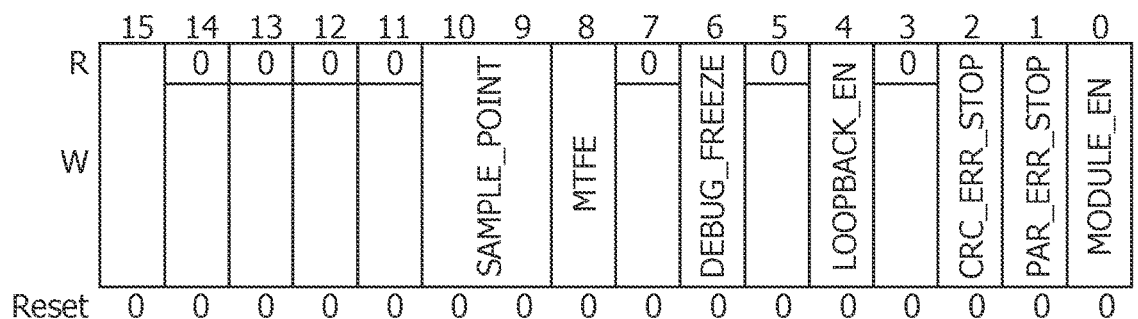
FIG. 15
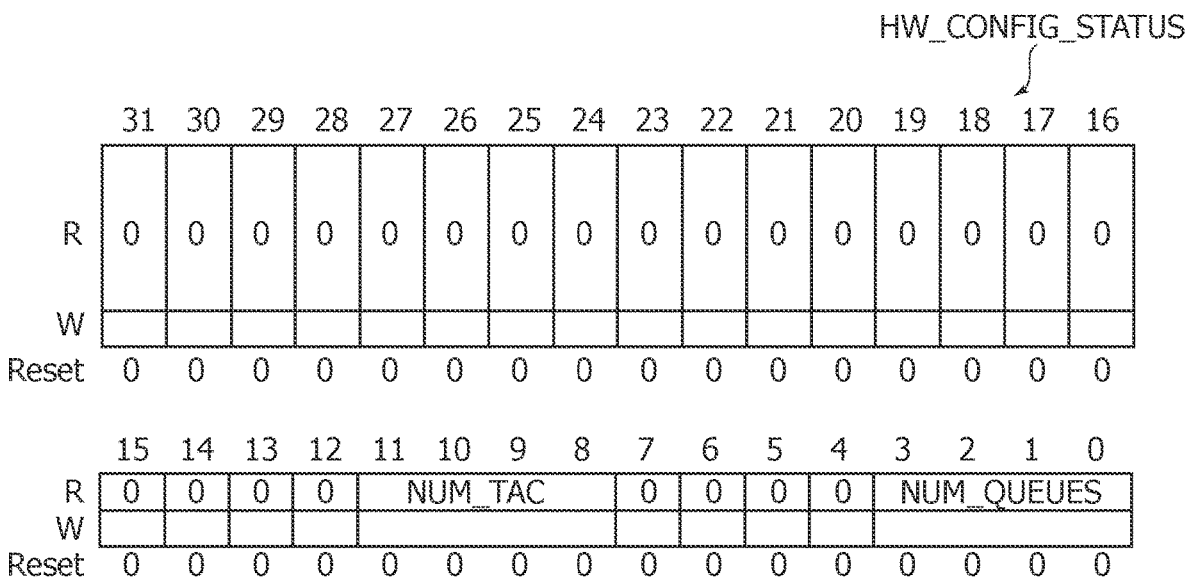

FIG. 16 GLOBAL_STATUS

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | 0 | 0 | 0 | 0 | 0 | 0 | 0 | 0 | QUEUE_NUM | | | | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | 0 | 0 | 0 | 0 | 0 | 0 | 0 | SPIQ_STATUS | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FIG. 17 GLOBAL_IRQ_CTRL

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | 0 | 0 | 0 | 0 | 0 | 0 | 0 | 0 | ERR_IRQ_EN | | | | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | 0 | 0 | STATUS_IRQ_EN | | | | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FIG. 18 GLOBAL_STATUS

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | 0 | 0 | 0 | 0 | 0 | 0 | 0 | 0 | ERR_IRQ_STATUS | | | | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | 0 | 0 | STATUS_IRQ | | | | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FIG. 20

TAC_L

| R/W | 31 DBR | 30 0 | 29 28 PBR | 27 26 25 24 BR | 23 22 PLD | 21 20 PTD | 19 18 PNFD | 17 16 PIWD |
|---|---|---|---|---|---|---|---|---|
| Reset | 0 | 0 | 0 0 | 0 0 0 0 | 0 0 | 0 0 | 0 0 | 0 0 |

| R/W | 15 14 13 12 LD | 11 10 9 8 TD | 7 6 5 4 NFD | 3 2 1 0 IWD |
|---|---|---|---|---|
| Reset | 0 0 0 0 | 0 0 0 0 | 0 0 0 0 | 0 0 0 0 |

FIG. 21

TAC_H

| R/W | 31 CPOL | 30 CPHA | 29 LSBFE | 28 27 26 25 24 SCK_DISABLE_CYCLES | 23 22 21 | 20 19 18 17 16 FMSZ |
|---|---|---|---|---|---|---|
| Reset | 0 | 0 | 0 | 0 0 0 0 0 | 0 0 0 | 0 0 0 0 0 |

| R/W | 15 14 13 12 11 10 9 8 7 6 5 4 3 2 1 0 DTC |
|---|---|
| Reset | 0 0 0 0 0 0 0 0 0 0 0 0 0 0 0 0 |

FIG. 22

TAC_H_SLAVE

| R/W | 31 CPOL | 30 CPHA | 29 0 | 28 0 | 27 0 | 26 0 | 25 0 | 24 0 | 23 0 | 22 0 | 21 20 19 18 17 16 FMSZ |
|---|---|---|---|---|---|---|---|---|---|---|---|
| Reset | 0 | 0 | 0 | 0 | 0 | 0 | 0 | 0 | 0 | 0 | 0 0 0 0 0 0 |

| R/W | 15 PE | 14 PP | 13 0 | 12 0 | 11 0 | 10 0 | 9 0 | 8 0 | 7 0 | 6 0 | 5 0 | 4 0 | 3 0 | 2 0 | 1 0 | 0 0 |
|---|---|---|---|---|---|---|---|---|---|---|---|---|---|---|---|---|
| Reset | 0 | 0 | 0 | 0 | 0 | 0 | 0 | 0 | 0 | 0 | 0 | 0 | 0 | 0 | 0 | 0 |

FIG. 23

MONITOR_SLAVE_SELECT

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | MONITOR_SPI_CONNECTED | | 0 | 0 | 0 | 0 | 0 | 0 | 0 | 0 | 0 | 0 | 0 | 0 | 0 | 0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R W | 0 | 0 | 0 | 0 | MONITOR_SPI_SLAVE_SELECT | | | | | | | | | | | |
| Reset | 0 | 0 | 0 | 0 | 0 | 0 | 0 | 0 | 0 | 0 | 0 | 0 | 0 | 0 | 0 | 0 |

FIG. 24

Q_SETUP

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | | | | 0 | 0 | 0 | TIMESTAMP_NOT_TRANSFER_CNT | 0 | HW_TRIG_OUT_WIDTH | | | | | | | |
| W | PRIORITY | | | | | | | Rx_STATUS_EN | | | | 0 | 0 | 0 | 0 | 0 |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | RxDMA_EN | RxFULL_STALL_EN | 0 | RxFIFO_THRESHOLD | | | | | TxDMA_EN | HW_TRIG_EDGE | HW_TRIG_EN | TxFIFO_THRESHOLD | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FIG. 25

Q_HW_CFG

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | RxFIFO_DEPTH | | | | | 0 | 0 | 0 | TxFIFO_DEPTH | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FIG. 26

Q_STATUS

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | TRANSFER_COUNT | | | | | | | | | | | | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | 0 | 0 | 0 | 0 | 0 | Q_STATUS | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FIG. 27

Q_CTRL

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | 0 | 0 | 0 | 0 | 0 | 0 | 0 | 0 | Q_FLUSH | Q_SW_TRIG |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FIG. 28

Q_IRC_CTRL

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | PARITY_ERR_IRQ_EN | CRC_ERR_IRQ_EN | TRIG_OVERRUN_ERR_IRQ_EN | COMMAND_ERR_IRQ_EN | 0 | 0 | EOS_IRQ_EN | FRAME_END_IRQ_EN | 0 | 0 | 0 | | | | | |
| W | | | | | | | | | | | | 0 | 0 | 0 | 0 | 0 |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | RXFIFO_OVERRUN_IRQ_EN | RXFIFO_UNDERRUN_IRQ_EN | RXFIFO_FULL_IRQ_EN | RXFIFO_EMPTY_IRQ_EN | RXFIFO_THRESH_IRQ_EN | 0 | 0 | 0 | TXFIFO_OVERRUN_IRQ_EN | TXFIFO_UNDERRUN_IRQ_EN | TXFIFO_FULL_IRQ_EN | TXFIFO_EMPTY_IRQ_EN | TXFIFO_THRESH_IRQ_EN |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FIG. 29

Q_IRC_STATUS

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | PARITY_ERR | CRC_ERR | TRIG_OVERRUN | COMMAND_ERR | 0 | 0 | EOS | FRAME_END | 0 | 0 | 0 | 0 | 0 | 0 | 0 | 0 |
| W | w1c | w1c | w1c | | | | w1c | w1c | | | | | | | | |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | RXFIFO_OVERRUN_ERR | RXFIFO_UNDERRUN_ERR | RXFIFO_FULL | RXFIFO_EMPTY | RXFIFO_THRESH | 0 | 0 | 0 | TXFIFO_OVERRUN_ERR | TXFIFO_UNDERRUN_ERR | TXFIFO_FULL | TXFIFO_EMPTY | TXFIFO_THRESH |
| W | | | | w1c | w1c | | | | | | | w1c | w1c | | | |
| Reset | 0 | 0 | 0 | 0 | 0 | 0 | 0 | 0 | 0 | 0 | 0 | 0 | 0 | 0 | 0 | 0 |

FIG. 30

Q_TxFIFO_PTR

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | 0 | 0 | 0 | 0 | 0 | 0 | 0 | 0 | TxFIFO_ACTIVE_ENTIES | | | | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | TxFIFO_WR_PTR | | | | | | | | TxFIFO_RD_PTR | | | | | | | |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FIG. 31

Q_RxFIFO_PTR

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R | 0 | 0 | 0 | 0 | 0 | 0 | 0 | 0 | \multicolumn{8}{c|}{RxFIFO_ACTIVE_ENTIES} |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | \multicolumn{8}{c|}{RxFIFO_WR_PTR} | \multicolumn{8}{c|}{RxFIFO_RD_PTR} |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FIG. 32

Q_CRC_CFG

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R/W | 0 | 0 | 0 | 0 | 0 | 0 | 0 | 0 | 0 | 0 | 0 | 0 | 0 | 0 | 0 | 0 |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R/W | 0 | 0 | 0 | 0 | 0 | 0 | 0 | 0 | 0 | 0 | 0 | INV_OUT | 0 | \multicolumn{3}{c|}{CRC_SIZE} |
| Reset | 0 | 0 | 0 | 0 | 0 | 0 | 0 | 0 | 0 | 0 | 0 | 0 | 0 | 0 | 0 | 0 |

FIG. 33

Q_CRC_INT

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| R/W | \multicolumn{16}{c|}{CRC_INIT} |
| Reset | 0 | 0 | 0 | 0 | 0 | 0 | 0 | 0 | 0 | 0 | 0 | 0 | 0 | 0 | 0 | 0 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R/W | \multicolumn{16}{c|}{CRC_INIT} |
| Reset | 0 | 0 | 0 | 0 | 0 | 0 | 0 | 0 | 0 | 0 | 0 | 0 | 0 | 0 | 0 | 0 |

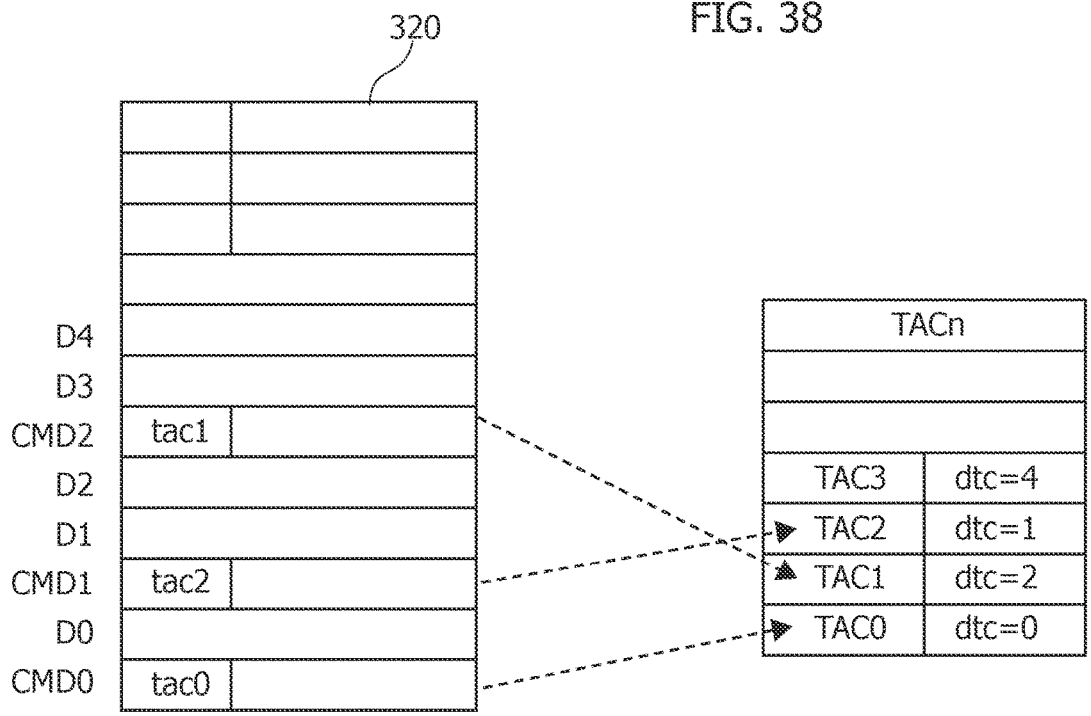

FIG. 39
| 31 | 30 | 29 | 28 | 27:24 | 23:0 | RxFIFO |
|---|---|---|---|---|---|---|
| PAR_ERR | CRC_ERR | 0 | EOS | PCS_NUM | TIMESTAMP_OR_TRANSFER_COUNT | |
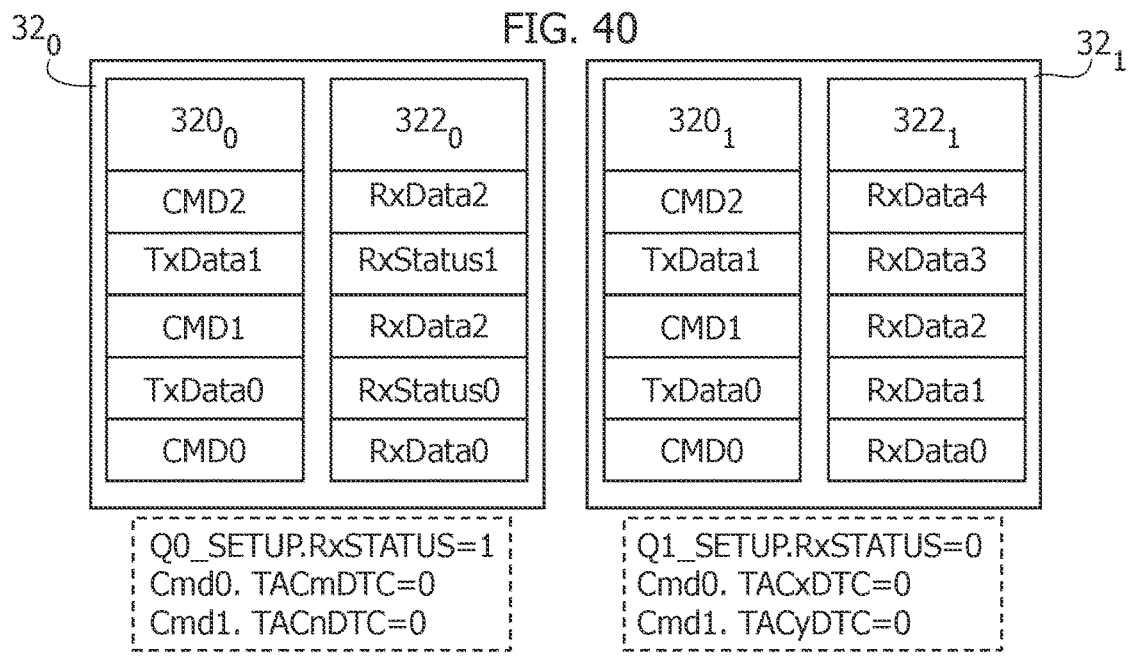
FIG. 40
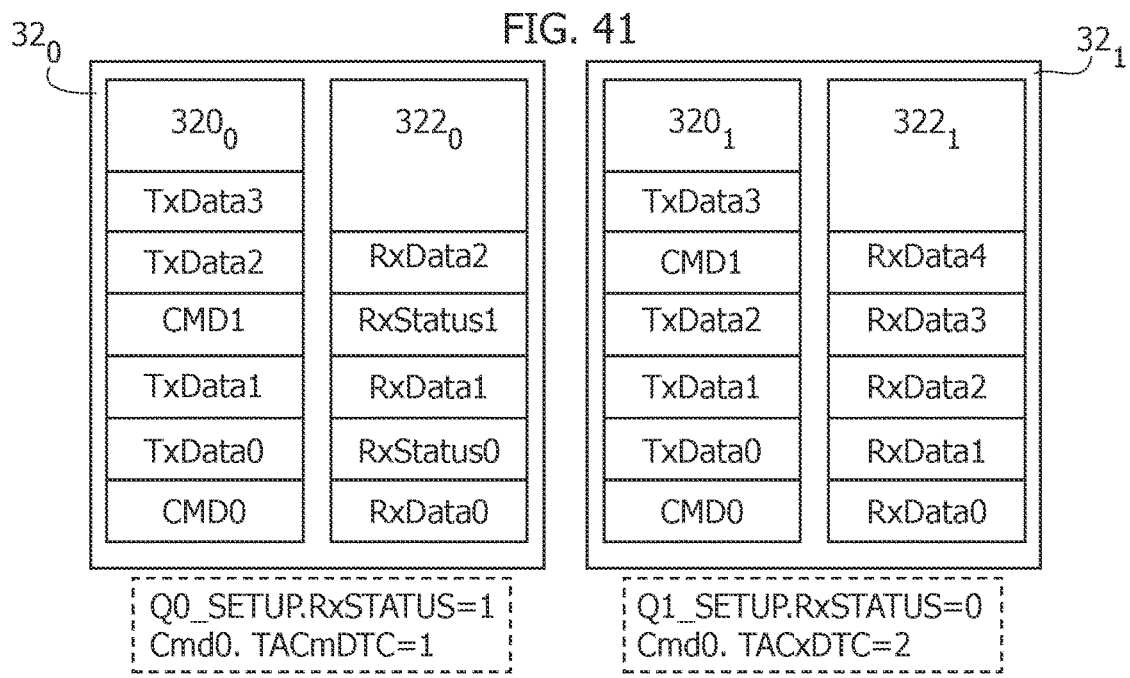
FIG. 41

PROCESSING SYSTEM COMPRISING A QUEUED SERIAL PERIPHERAL INTERFACE, RELATED INTEGRATED CIRCUIT, DEVICE AND METHOD

CROSS-REFERENCE TO RELATED APPLICATIONS

This application claims the benefit of Italian Application No. 102020000006322, filed on Mar. 25, 2020, which application is hereby incorporated herein by reference.

TECHNICAL FIELD

Embodiments of the present disclosure relate to queued communication interfaces and associated methods, in particular a Serial Peripheral Interface (SPI) comprising a plurality of queues, and associated methods.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), a Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Future generations of processing systems, in particular micro-controllers dedicated to automotive applications, will exhibit a significant increase in complexity, mainly due to the increasing number of functionalities (such as new protocols, new features, etc.) and to tighter constraints concerning the operation conditions of the system (such as lower power consumption, increased calculation power and speed, etc.).

FIG. 2 shows a block diagram of an exemplary digital processing system 10, such as a micro-controller, which may be used as any of the processing systems 10 of FIG. 1.

In the example considered, the processing system 10 comprises at least one processing unit 102, such as a microprocessor, usually the Central Processing Unit (CPU), programmed via software instructions. Usually, the software executed by the processing unit 102 is stored in a program memory 104, such as a non-volatile memory, such as a Flash memory or EEPROM. Generally, the memory 104 may be integrated with the processing unit 102 in a single integrated circuit, or the memory 104 may be in the form of a separate integrated circuit and connected to the processing unit 102, e.g., via the traces of a printed circuit board. Thus, in general the memory 104 contains the firmware for the processing unit 102, wherein the term firmware includes both the software of a micro-processor and the programming data of a programmable logic circuit, such as a FPGA.

In the example considered, the processing unit 102 may have associated one or more (hardware) resources 106 selected from the group of:

one or more communication interfaces IF, e.g., for exchanging data via the communication system 20, such as a Universal asynchronous receiver/transmitter (UART), Serial Peripheral Interface Bus (SPI), Inter-Integrated Circuit ($I^2C$), Controller Area Network (CAN) bus, and/or Ethernet interface, and/or a debug interface; and/or one or more analog-to-digital converters AD and/or digital-to-analog converters DA; and/or one or more dedicated digital components DC, such as hardware timers and/or counters, or a cryptographic co-processor; and/or one or more analog components AC, such as comparators, sensors, such as a temperature sensor, etc.; and/or one or more mixed signal components MSC, such as a PWM (Pulse-Width Modulation) driver.

Accordingly, the digital processing system 10 may support different functionalities. For example, the behavior of the processing unit 102 is determined by the firmware stored in the memory 104, e.g., the software instructions to be executed by a microprocessor 102 of a micro-controller 10. Thus, by installing a different firmware, the same hardware (micro-controller) can be used for different applications.

FIG. 3 shows an example of the communication between two processing systems $10_1$ and $10_2$ via a Serial Peripheral Interface (SPI), i.e. a communication interface IF of the processing system 10 is a SPI communication circuit 30. For example, such SPI communication interfaces are often used to connect a microcontroller 10 to a peripheral electronic device, e.g., mounted on the same Printed Circuit Board (PCB) or connected to the microcontroller 10 via a cable.

As well known in the art, in a SPI communication one of the devices, e.g., the device $10_1$, is a master device and the other device, e.g., $10_2$, is a slave device, and the communication between the device $10_1$ and $10_2$ is based on a bus 20 having four signals (e.g., applied to respective pads/pins of a respective die/integrated circuit package, and exchanged via respective conductors, such as wires or traces of a PCB), in particular:

a clock signal SCK provided by the master device $10_1$;

a first data signal SOUT provided by the master device $10_1$, often referred to as "Master Output Slave Input", representing the data output of the master $10_1$ and the data input of the slave $10_2$;

a second data signal SIN, provided by the slave device $10_2$, often referred to as "Master Input Slave Output", representing the data input of the master $10_1$ and the data output of the slave $10_1$; and a peripheral chip select signal PCS provided by the master device $10_1$, often referred to as "Slave Select".

Thus, SPI is a full-duplex serial communication protocol.

For example, FIG. 4 schematically shows a possible SPI communication. At a given time $t_0$ the salve select signal PCS is de-asserted and set to a first logic level (e.g., high) indicating that the communication/slave is disabled (idle state). At an instant $t_1$ the master device $10_1$ sets the signal PCS to a second logic level (e.g., low) indicating that the communication/slave is enabled. During a transmission phase between an instant $t_2$ and an instant $t_3$, the master device $10_1$ then generates a given first number of pulses in the clock signal SCK, and for each clock pulse in the signal SCK sets the signal SOUT either to high or low, thereby transmitting sequentially a transmission data word consisting in a bit sequence. Accordingly, the slave device $10_2$ may sample the signal SOUT, e.g., in response to the clock signal SCK. Optionally, the master device $10_1$ may then wait that the slave device 12 completes a given operation (e.g., in response to the transmitted command). During a reception phase between an instant $t_4$ and an instant $t_5$, the master device $10_1$ may then generate a given second number of pulses in the clock signal SCK. In response to this clock pulses, the slave device $10_2$ sets the logic level of the signal SIN either to high or low, thereby transmitting to the master device $10_1$ sequentially a reception data word consisting in a bit sequence. Accordingly, the master device $10_1$ may sample the signal SIN, e.g., in response to the clock signal SCK. Once the transmission is completed, the master device $10_1$ sets at an instant $t_6$ the signal PCS again to the first logic level (e.g., high) indicating that the communication/slave is disabled. Generally, due to the fact that the communication is full duplex, both the master and the slave device may also transmit data contemporaneously.

FIG. 5 shows that also a plurality of slave devices $10_2$, $10_3$ and $10_4$ may be connected to the same master device $10_1$, in particular the same communication interface 30, wherein each slave device $10_2$, $10_3$ and $10_4$ comprises terminals for exchanging the signals SCK, SOUT and SIN with the master device $10_1$, i.e. the signals SCK, SOUT and SIN are shared, and each slave device $10_2$, $10_3$ and $10_4$ may comprise a slave select terminal PCS connected to a respective slave select terminal of the master device $10_1$, i.e. the master device $10_1$ generates a plurality of slave select signals PCS1, PCS2, PCS3, one for each slave device $10_2$, $10_3$ and $10_4$, i.e. the slave select signal PCS is a dedicated signal. Generally, the slave select signals PCS1, PCS2, PCS3 may be generated directly by the interface circuit 30 and/or via software commands executed by the processing circuit 102, e.g., by using General Purpose I/O pins (GPIO) of the processing system $10_1$.

While SPI communication is well known in the art, unfortunately a significant number of implementation variants have been used. For example, often one or more of the following parameters may change between various slave devices:

the number of bits to be transmitted from the master device $10_1$ to the slave device $10_2$, i.e. the length of a transmission data word (which may also be variable as a function of a command transmitted to the slave device) and/or the number of bits to be received by the master device $10_1$ from the slave device $10_2$, i.e. the length of a reception data word (which may also be variable as a function of a command transmitted to the slave device);

the supported clock frequency or clock frequency range of the signal SCK;

the clock polarity, i.e. the logic level of the clock signal SCK during the idle state; and the clock phase, i.e. whether the slave device transmits data in response to a rising or falling edge of the clock signal SCK.

Accordingly, when a plurality of slave devices $10_2$, $10_3$ and $10_4$ is connected to a master device $10_1$, each data transmission may require a respective re-configuration of the interface 30 of the master device $10_1$ in order to correctly exchange data with the respective slave device $10_2$, $10_3$ or $10_4$.

In general, the SPI communication interface 30 comprises an interface 32 through which the processing circuit 102 may exchange data with the SPI interface 32. Often such an interface 32 is a register interface, wherein the interface 32 is associated with given addresses in the memory range of the processing circuit 102.

In the past have also been proposed so called Queued Serial Peripheral Interface (QSPI), wherein the interface 32 comprises a data queue used to transfer data across the SPI bus 20. Typically, in this case, the interface 32 comprises a first (transmission, TX) memory 320, such as a First-In First-Out (FIFO), in which the data to be transmitted are stored and a second (reception, RX) memory 322, such as a FIFO memory, in which the received data are stored. Accordingly, in this case, the processing circuit 102 may exchange data with a slave device via the interface 32 by configuring the SPI interface 30, (sequentially) storing data to the TX memory 320, and optionally (sequentially) reading the received data from the RX memory 322.

Accordingly, as also shown in FIG. 6, a SPI interface 30 may be used to communicate with a plurality of slave devices $10_2 \ldots 10_6$. The separate communications, with possible different characteristics and/or the generation of the respective slave select signal, have to be managed by the master device $10_1$. Accordingly, the communication with a plurality of different slave devices $10_2 \ldots 10_6$ may be rather complex from an implementation point of view of the SPI interface 30.

Moreover, the inventor has observed that it is often preferably to manage the communication with a given slave device $10_2 \ldots 10_6$ via a respective software module/task, e.g., tasks SWT1 ... SWT5 for the communication with the slave devices $10_2 \ldots 10_6$, respectively. Generally, each task may refer to the activity of an operating system OS or an application APP, e.g., executed by such an operating system OS.

However, when using a single SPI communication interface 30 different software tasks executed by the processing circuit 102 may have to exchange data with the interface 32, such as the memories 320 and 322.

The inventor has observed, that this problem could be solved by providing a plurality of SPI interfaces within the processing system 10. However, this solution may be unfeasible because each SPI interface requires four pins of the processing system 10.

FIG. 7 shows in this respect a typical software architecture. Often the software executed by a microprocessor 102 comprises an operating system OS, which is configured to execute at least one application APP. Usually the operating system OS comprises drivers DRV, which permit the use of given hardware resources HW of the processing system 10, such as the resources 106, such as the SPI communication interface 30. For example, a driver DRV may manage the communication with the SPI interface 30, e.g., by providing given software functions to the operating system OS and/or the application(s) APP, which permits configuration of the SPI interface 30, transmit data and read the received data. These software commands may then be converted by the driver DRV into commands, which access the interface 32 of the SPI communication interface, e.g., in order to program the registers of a respective register interface 32.

The inventor has observed that such a hardware driver DRV of an operating system OS executed by the processing circuit 102 could thus manage different virtual software interfaces for the upper software layer (e.g., the operating system OS or an application APP), and then perform the configuration and data exchange with the single hardware SPI interface IF. However, this has several disadvantages. For example, on the one hand, this may involve security issues, because e.g., each software task SWT could access the registers of the SPI interface 30, thereby possibly reading the data associated with another task SWT. Moreover, each software task SWT is able to exchange data with all slave devices, while in some cases it would be preferable that a given software task SWT may only exchange data with a given slave device. On the other hand, the driver DRV has to be able to manage parallel write/read requests. For example, parallel transmission requests imply that a decision has to be taken, which task SWT may transmit first data. However, when using e.g., a queued SPI 30, the interface 32 comprises only a single transmission queue 320. Accordingly, in order to manage also different priorities of communication, the driver DRV would need to manage additional virtual queues. All these software emulated interfaces would thus require extra processing power and memory space.

SUMMARY

In view of the above, it is an objective of various embodiments of the present disclosure to provide improved solutions for a SPI communication interface.

According to one or more embodiments, one or more of the above objectives is achieved by means of a processing system comprising a queued serial peripheral interface having the features specifically set forth in the claims that follow. Embodiments moreover concern a related integrated circuit, device and method.

The claims are an integral part of the technical teaching of the disclosure provided herein.

As mentioned before, various embodiments of the present disclosure relate to a processing system, such as a microcontroller, comprising a digital processing circuit, preferably programmable as a function of a firmware stored to a non-volatile memory, and a SPI circuit. In various embodiments, the SPI circuit comprises a hardware SPI communication interface, an arbiter and plurality of interface circuits.

In various embodiments, the hardware SPI communication interface comprises one or more shift registers configured to generate a first serial data signal as a function of a transmission data word and a reception data word by sampling a second serial data signal, and a control circuit configured to generate a clock signal for the one or more shift registers. In various embodiments, the arbiter is configured to provide the transmission data word to the hardware SPI communication interface and receive the reception data word from the hardware SPI communication interface.

In various embodiments, each interface circuit comprises a transmission FIFO memory, a reception FIFO memory and an interface control circuit. Specifically, the interface control circuit is configured to receive one or more first data packets from the digital processing circuit and store the received one or more first data packets to the transmission FIFO memory. Next, the interface control circuit sequentially reads the one or more first data packets from the transmission FIFO memory, extracts from the one or more first data packets at least one transmission data word, and provides the at least one extracted transmission data word to the arbiter. In turn, the interface control circuit receives from the arbiter the reception data word and stores one or more second data packets to the reception FIFO memory, the one or more second data packets comprising the received reception data word. Finally, the interface control circuit sequentially reads the one or more second data packets from the reception FIFO memory and transmits the one or more second data packets to the digital processing circuit.

In various embodiments, the one or more first data packets comprise a command followed by at least one transmission data word, wherein the command comprises a field for storing data indicating a data transfer count identifying the number of transmission data words following the command. In this case, the interface control circuit may be configured to extract the command from the one or more first data packets, determine the data transfer count, extract from the one or more first data packets a number of transmission data words as indicated by the data transfer count, and provide the extracted transmission data words to the arbiter.

For example, in various embodiments, the SPI circuit comprises a set of global configuration registers for specifying a plurality of transmission attribute items, wherein each transmission attribute item comprises a respective field for storing the data transfer count, and wherein the command comprises a field indicating one of the transmission attribute items. In this case, each transmission attribute item may also comprise one or more fields for storing at least one of: data indicating the timing of the clock signal, data indicating the inactive state of the clock signal, data indicating whether the one or more shift registers generate the first serial data signal and/or sample the second serial data signal in response to a rising or falling edge of the clock signal, and data indicating the number of bits of the transmission data word to be transmitted via the first serial data signal.

In various embodiments, the command may comprise also further configuration data. For example, in various embodiments, the control circuit is configured to generate a plurality of slave select signals, and the command may comprise data indicating which slave select signal should be set during the transmission of the respective transmission data words. In various embodiments, the command may also comprise data indicating the priority of the respective extracted transmission data word provided to the arbiter. Conversely, in other embodiments, each interface circuit comprises a respective set of individual configuration registers, wherein each set of individual configuration registers comprises one or more fields for storing the data indicating the priority of the respective extracted transmission data word provided to the arbiter.

Accordingly, in various embodiments, the SPI circuit may comprise a set of global configuration registers for configuring the hardware SPI communication interface and/or the arbiter, and each interface circuit may comprise a respective set of individual configuration registers for configuring the respective interface circuit. In this case, respective memory address ranges in the address range of the digital processing circuit may be associated with the set of global configuration registers and the sets of individual configuration registers, and the processing system may be configured to limit access to the memory address ranges for given software tasks executed by the digital processing circuit.

For example, in various embodiments, the digital processing circuit is configured to execute (and accordingly may also execute) a hypervisor providing a plurality of execution environments, wherein each execution environment is configured to execute a respective operating system. Accordingly, in this case, the hypervisor may be configured to limit access to the memory address ranges for the execution environments.

In various embodiments, the SPI circuit may also exchange data with the digital processing unit via DMA requests. For example, in various embodiments, the processing system comprises a memory connected to the digital processing unit and a DMA controller configured to read data from the memory as a function of a data read request received via a first DMA channel and to store data to the memory as a function of a data write request received via a second DMA channel. In this case, the SPI circuit may comprise a DMA interface configured to communicate with the DMA controller, and the interface control circuit of at least one interface circuit may be configured to receive the one or more first data packets by sending a data read request via the DMA interface to the DMA controller, and transmit the one or more second data packets by sending a data write request via the DMA interface to the DMA controller.

Specifically, in various embodiments, the at least one interface circuit comprises a respective set of individual configuration registers for configuring a first threshold of free entries in the transmission FIFO memory and a second threshold of filled entries in the reception FIFO memory. In this case, the interface control circuit of the at least one interface circuit may be configured to determine whether the number of free entries in the transmission FIFO memory exceeds the first threshold, and send the data read request via the DMA interface to the DMA controller when the number of free entries in the transmission FIFO memory exceeds the first threshold. Similarly, the interface control circuit of the at least one interface circuit may be configured to determine whether the number of filled entries in the reception FIFO memory exceeds the second threshold, and send the data write request via the DMA interface to the DMA controller when the number of filled entries in the reception FIFO memory exceeds the second threshold.

BRIEF DESCRIPTION OF THE DRAWINGS

Embodiments of the present disclosure will now be described with reference to the annexed drawings, which are provided purely by way of non-limiting example and in which:

FIGS. 14 to 18, 20 to 37 and 39 show various configuration registers of embodiments of SPI communication interfaces;

FIGS. 38, 40 and 41 show embodiments of data packets provided to a SPI communication interface and data packets received from the SPI communication interface.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
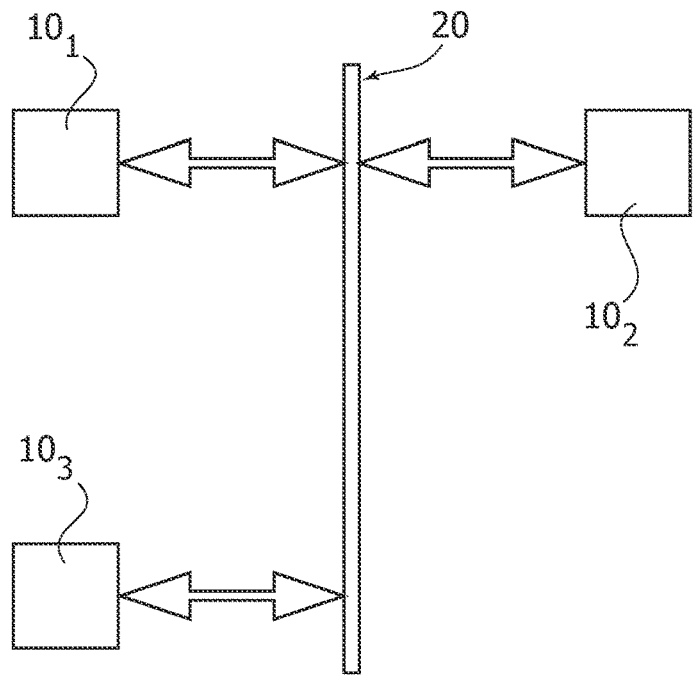
FIG. 1 shows an example of an electronic system comprising a plurality of processing systems.
Figure 2:
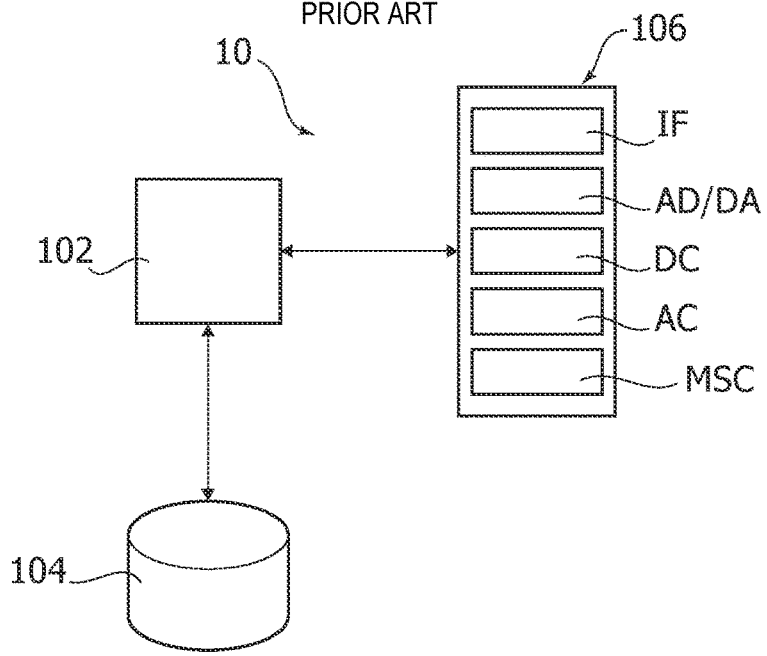
FIG. 2 shows an example of a processing system, such as a microcontroller.
Figure 3:
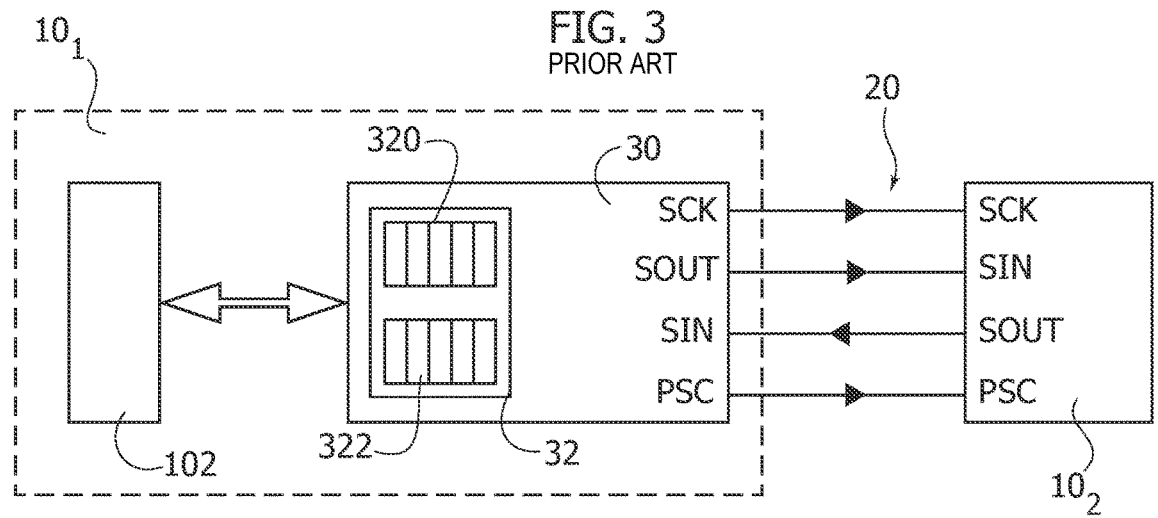
FIG. 3 shows an example of an SPI communication between a master device and a slave device.
Figure 4:
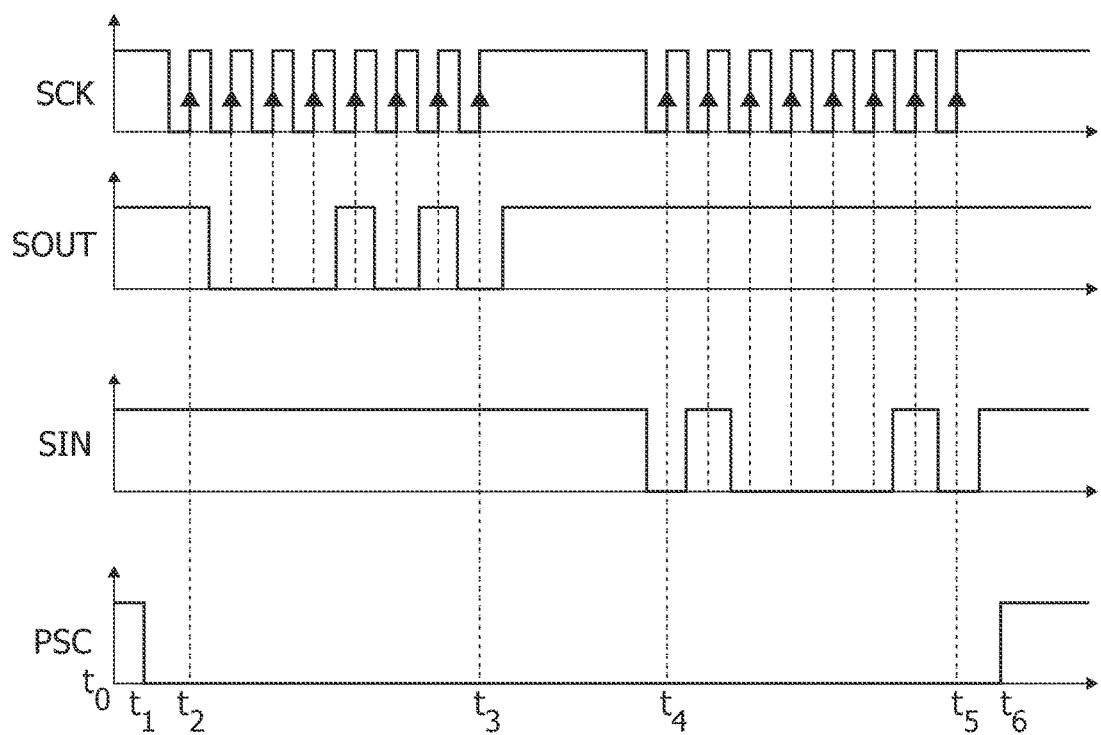
FIG. 4 shows an example of data exchanged via a SPI communication.
Figure 5:
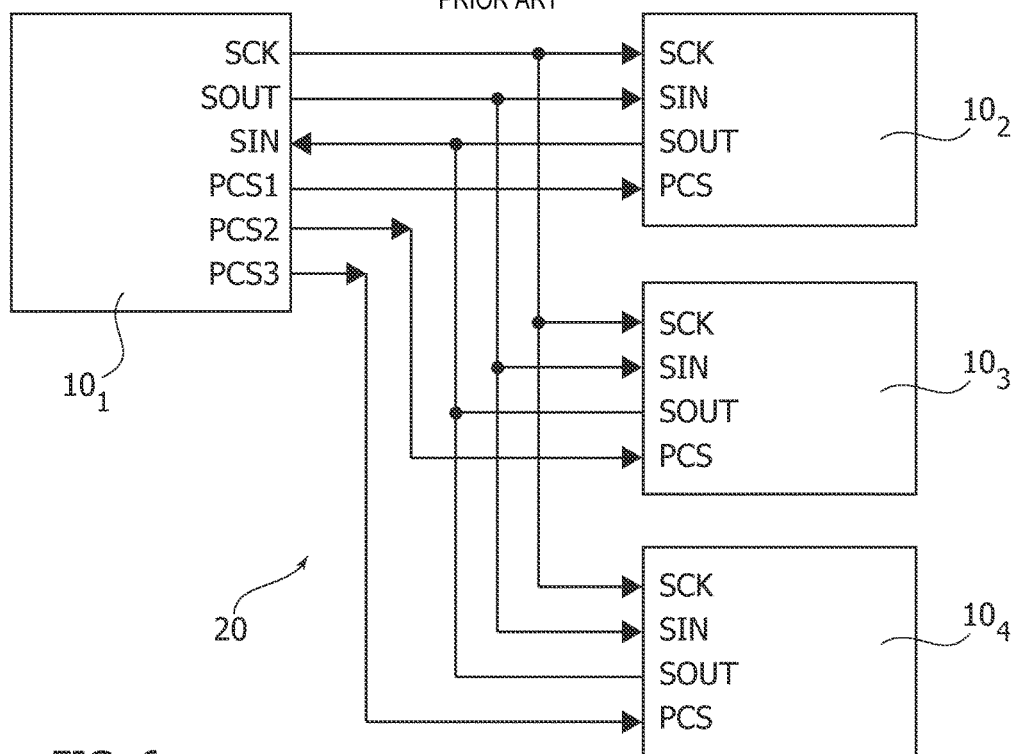
FIG. 5 shows an example of a SPI communication between a master device and a plurality of slave devices.
Figure 6:
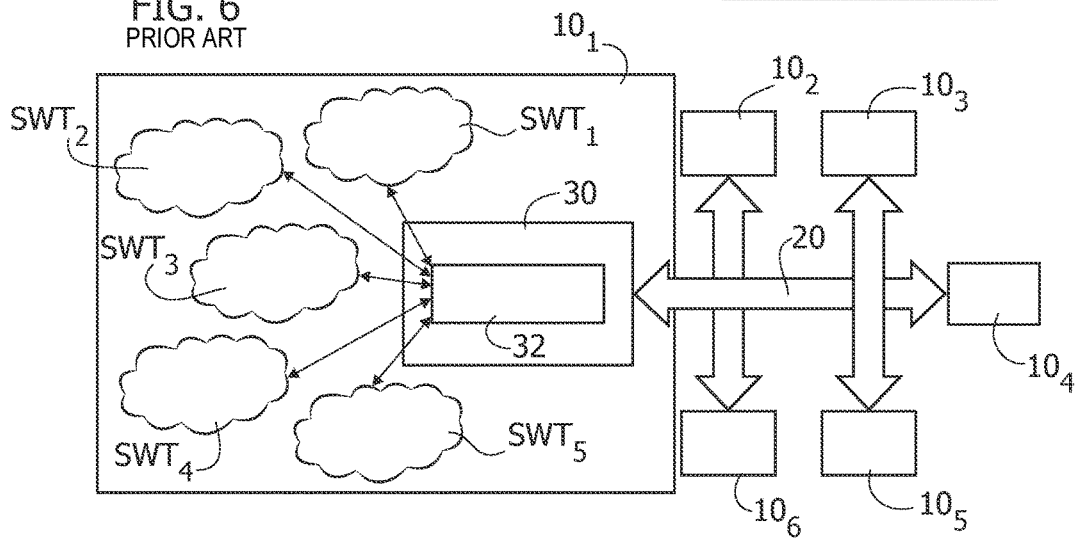
FIG. 6 shows an example of a plurality of software tasks which use the same SPI communication interface for communicating with a plurality of slave devices.
Figure 7:
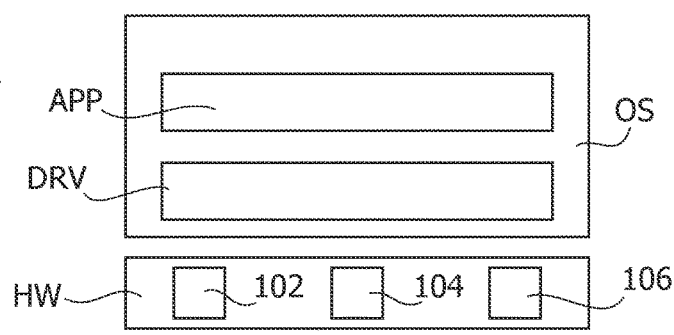
FIG. 7 shows an example of the software layers of the software executed by a processing system.

In the following FIGS. 8 to 42 parts, elements or components which have already been described with reference to FIGS. 1 and 7 are denoted by the same references previously used in such Figures; the description of such previously described elements will not be repeated in the following in order not to overburden the present detailed description.

As mentioned before, various embodiments of the present disclosure relate to a SPI communication interface. Specifically, in various embodiments, the SPI communication interface provides a plurality of interfaces to the processing circuit 102, which thus permits that each software task SWT requiring the use of a SPI interface, may use a respective interface of the SPI communication interface.

Figure 8:
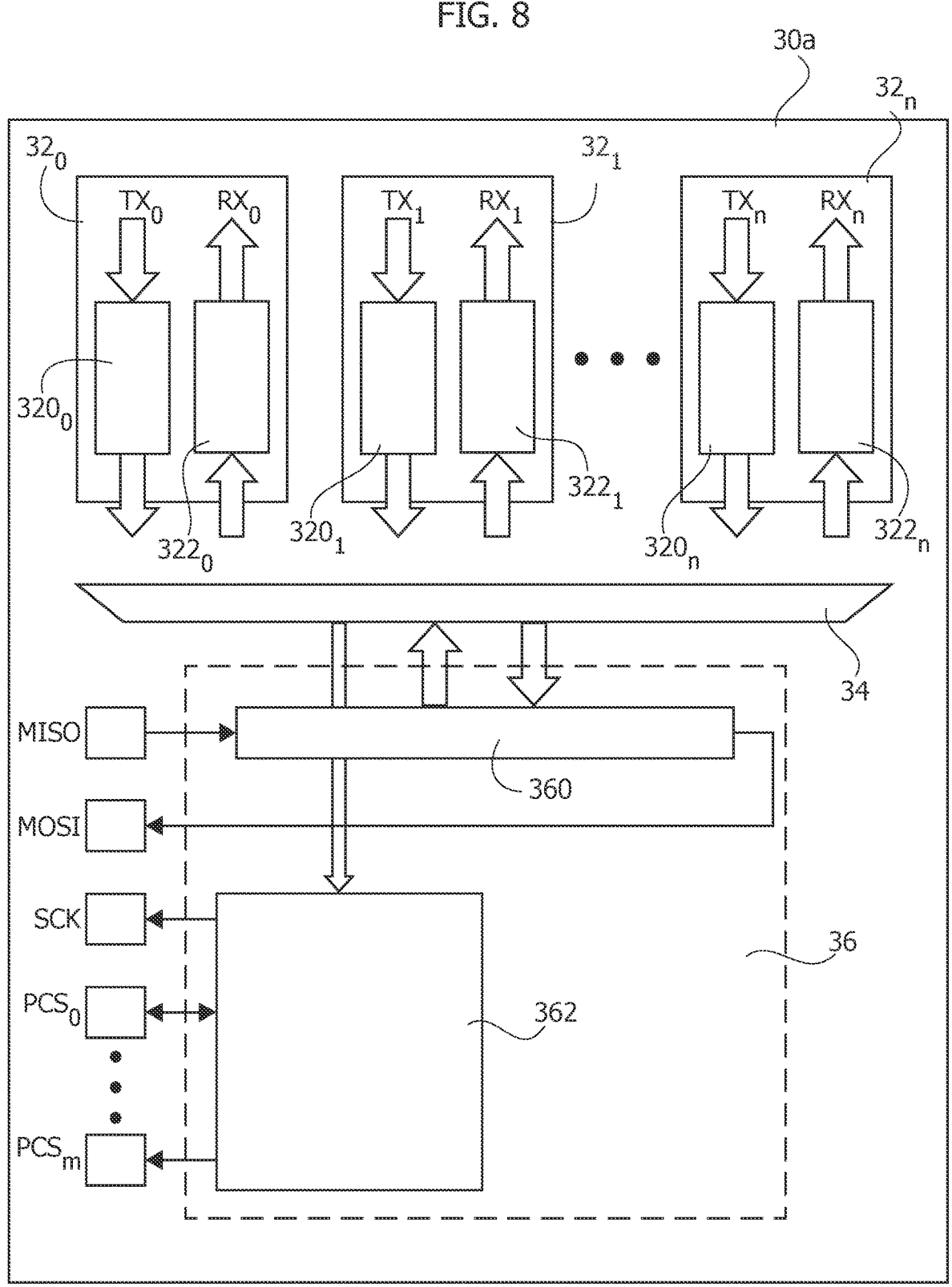
FIG. 8 shows an embodiment of a SPI communication interface in accordance with the present disclosure.

FIG. 8 shows a first embodiment of a SPI interface circuit 30a in accordance with the present disclosure. Specifically, in the embodiment considered, the SPI interface 30a comprises a given number (n+1), e.g., n=7, of interfaces $32_0, \ldots 32_n$, wherein each interface 32 comprises a respective transmission queue $320_0 \ldots 320_n$ for storing respective transmission data packets $TX_0 \ldots TX_n$, such as a respective FIFO memory, and a respective reception queue $322_0 \ldots 322_n$ for storing received data packets $RX_0 \ldots RX_n$, such as a respective FIFO memory.

In the embodiments considered, the transmission queues $320_0 \ldots 320_n$ and reception queues $322_0 \ldots 322_n$ are connected to an arbiter 34 configured to decide which of the transmission data should be provided to a hardware SPI communication interface 36. For example, in various embodiments, the hardware SPI communication interface 36 comprises at least one register 360 for storing the data to be transmitted via the signal SOUT and the data received via the signal SIN. For example, the at least one register 360 may comprise one or more shift registers. Specifically, in the embodiment considered, a single shift register 360 is used, wherein a serial input of the shift register 360 is connected to the signal SIN and a serial output of the shift register 360 is connected to the signal SOUT. Preferably, parallel interfaces of the shift register(s) 360 are used to exchange (via the arbiter 34) data between the register(s) 360 and the queues 320 and 322.

In the embodiment considered, the hardware SPI communication interface 36 comprises also a control circuit 362 configured to generate the (serial) clock signal SCK and a given number (m+1), e.g., m=12, of slave select signals $PCS_0 \ldots PCS_m$, identified in the following also in the form of a data vector PCS[m:0], e.g., PCS[11:0].

Accordingly, in the embodiment considered, the arbiter 34 may decide which of the interfaces $32_0 \ldots 32_n$ is selectively connected to the hardware SPI communication interface 36. For example, a first data packet $TX_{0,1}$ may be provided via the transmission signal $TX_0$ to the queue $320_0$. In various embodiments, the data packets exchanged via the various signals TX and RX have a given first number of bits, such as 8, 16, 32 or 64 bits, and the register 360 has a given second number of bits, such as 8, 16, 32 or 64 bits. Preferably, the first and second numbers correspond, the second number is a multiple of the first number or the first number is a multiple of the second number.

In various embodiments, for this purpose, the arbiter 34 is configured to determine a transmission request. For example, the arbiter 34 may determine automatically a transmission request by monitoring the fill status of the transmission queue, such as an empty signal indicating whether the FIFO memory is empty or comprises at least one element. Additionally or alternatively, the circuit requesting a transmission may set a respective transmission request signal, such as a hardware or software transmission request trigger signal.

Accordingly, in response to the transmission request, the arbiter 34 connects the queue to the register 360, whereby the first data packet $TX_{0,1}$ is stored in the register 360. Generally, in order to fill the register 360 only a part or a plurality of data packets may be read from the queue $320_0$. However, as mentioned before, preferably the register 360 has the dimension of each data packet stored to the queues 320/322, which preferably corresponds to the word length of the processing circuit 102.

Accordingly, once data have been stored to the register 360, preferably via a parallel write access to the register 360, the control circuit 362 may generate the clock signal SCK and set at least one of the slave select signals PCS[m:0]. For this purpose, as will be described in greater detail in the following, the control circuit 362 may have associated:
  a global set of configuration registers, which is common for all interfaces $32_0 \ldots 32_n$; and/or
  a set of individual configuration registers for each interfaces $32_0 \ldots 32_n$.

For example the individual registers of a given interface $32_0 \ldots 32_n$ may comprise data identifying the requested properties of the clock signal SCK, the slave select signals PCS[m:0] to be set, and/or the number of bits to be transmitted.

Accordingly, in response to the configuration, the control circuit 362 may generate a given first number of clock pulses for sequentially transmitting the bit levels of the data stored to the register 360 via the signal SOUT. If requested, the control circuit 362 may then generate a given second number of clock pulses for sampling the bit level of the signal SIN and sequentially storing the received bits to the register(s) 360.

For example, assuming that the SPI transmission with a given slave is based on a request comprising 16 bits used to request data having 16 bits, the interface 30a may be configured to transmit data words having 16 bits. Next a first transmission data packet may comprise the request and a second transmission data packet may comprise default data, such as a bit sequence having all bits set to "1" or "0". Thus, in response to the transmission of the two transmission data packet, the SPI interface 36 would provide a first reception data packet comprising default data, such as a sequence of bits set to "1" or "0", and a second reception data packet comprising the data determined as a function of the transmitted request.

Once the received data are stored to the register(s) 360, the arbiter 34 may store the data to the reception queue $322_0$. Specifically, due to the fact that SPI communication is based on a master-slave communication, data may only be received in response to a previous request by the interface 36, which may also be implicit by setting a slave select signal. Accordingly, the received data are univocally linked to a given transmission request performed by a given interface 32.

Figure 9:
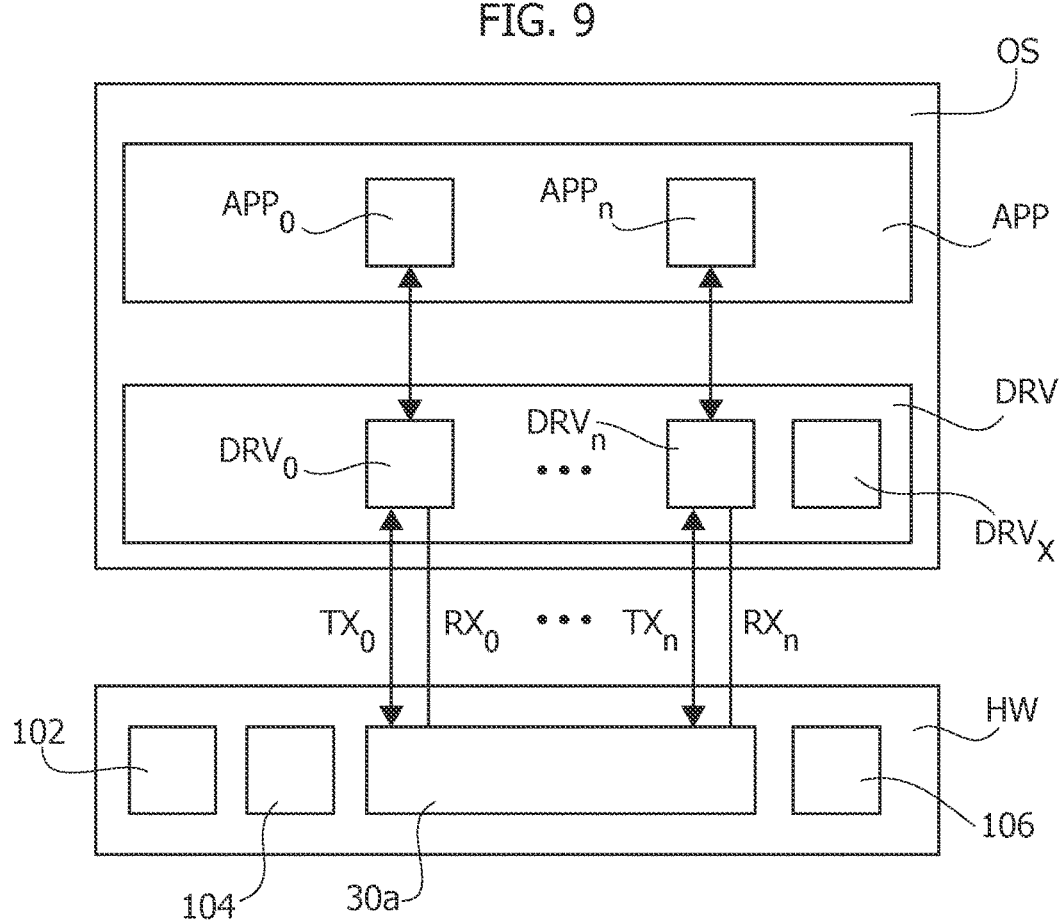
FIG. 9 shows a first embodiment of the software layers of the software executed by a processing system.

FIG. 9 shows in this respect an embodiment of a modified software architecture. Specifically, also in this case, the software executed by the microprocessor 102 comprises an operating system OS which is configured to execute at least one application APP. Also in this case, the operating system OS may comprise drivers DRV, which permit the use of given hardware resources 106 of the processing system 10, such as resources 106, including the SPI communication interface 30a, such as one or more drivers $DRV_x$ for the one or more resources 106.

However, in this case, the drivers DRV may include a plurality of drivers $DRV_0 \ldots DRV_n$, wherein each driver $DRV_0 \ldots DRV_n$ is configured to manage the communication with a respective interface $32_0 \ldots 32_n$, e.g., by providing given software functions to the operating system OS and/or the application(s) APP, which permits configuration of the SPI interface 30, transmit data and read the received data. These software commands may then be converted by the respective driver DRV into commands, which access the respective interface $32_0 \ldots 32_n$. Accordingly, in the embodiment considered, each driver $DRV_0 \ldots DRV_n$ may only communicate with a respective interface $32_0 \ldots 32_n$.

Accordingly, the various software tasks, such as applications $APP_0 \ldots APP_n$, may use a respective dedicated driver $DRV_0 \ldots DRV_n$.

Figure 10:
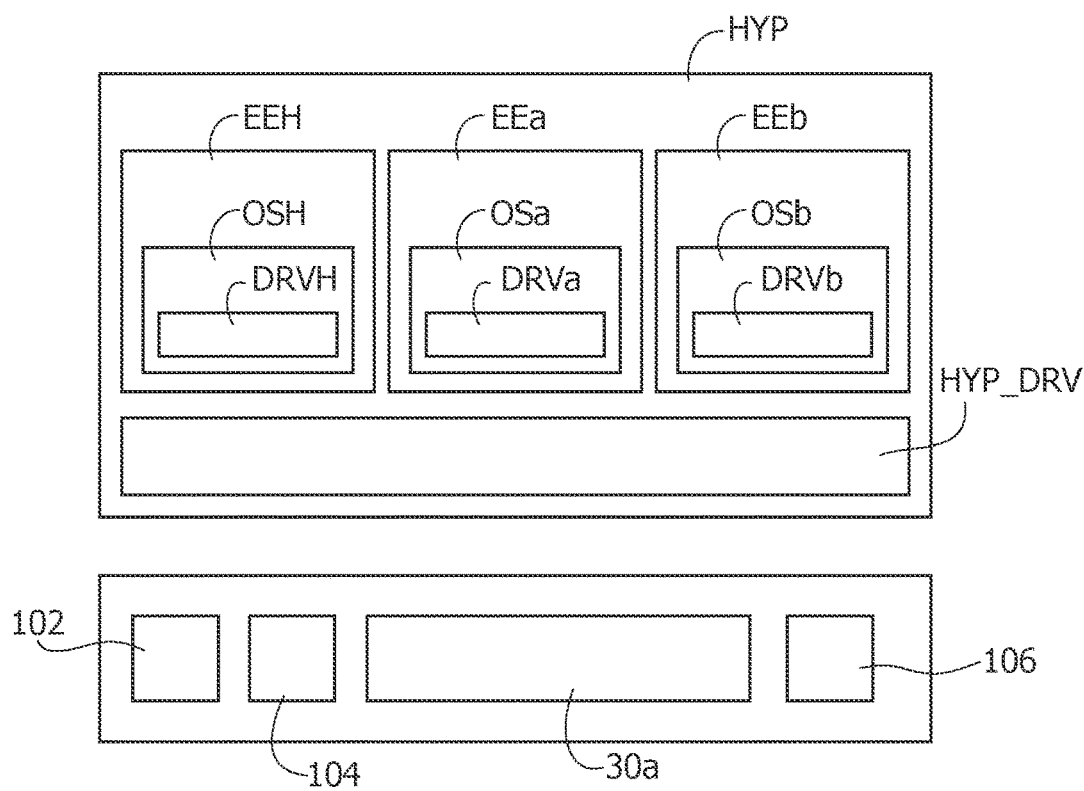
FIG. 10 shows a second embodiment of the software layers of the software executed by a processing system.

FIG. 10 shows a second embodiment of a modified software architecture. Specifically, in this case, the software executed by the microprocessor 102 comprises a hypervisor HYP, such as a hypervisor operating system.

Such a hypervisor HYP may provide a plurality of execution environments, such as an execution environment EEH, and one or more execution environments EEa, EEb, etc. Specifically, each execution environments permits to execute a respective operating system. For example, the execution environments EEH, EEa and EEb may execute operating systems OSH, OSa and OSb, respectively. For example, the execution environment EEH may be used to execute a host operating system, which is used to manage the operation of the hypervisor HYP. Conversely, the execution environments EEa and EEb may be used to execute respective guest operating systems OSa and OSb. Accordingly, each operating system EEH, EEa and EEb may comprise also a respective driver layer DRVH, DRVa and DRVb. Similarly, also the hypervisor HYP may comprise a driver layer HYP_DRV.

Accordingly, in various embodiments, the hypervisor HYP may be configured, e.g., via the host environment EEH, to assign a given subset of interfaces $32_0 \ldots 32_n$ to each of the execution environments EEH, EEa and EEb. For example, by using interfaces $32_0 \ldots 32_n$, which are addressable by the processing unit 102, a hardware memory protection unit of the processing system 10 or a software memory protection unit, e.g., implemented within the hypervisor HYP, may be used to ensure that each execution environment may access only the address range of the interfaces $32_0 \ldots 32_n$ enabled for a given execution environment. Accordingly, in this way, a given software task, such as an application, may only use the interface(s) $32_0 \ldots 32_n$ assigned to the respective execution environment.

Moreover, in various embodiments, the hypervisor HYP may also configure part of the interfaces $32_0 \ldots 32_n$, e.g., via the host environment EEH, e.g., in order to indicate for each interfaces $32_0 \ldots 32_n$, which slave select signals PCS may be set, thereby specifying with which slave device a given execution environment may communicate.

Figure 11:
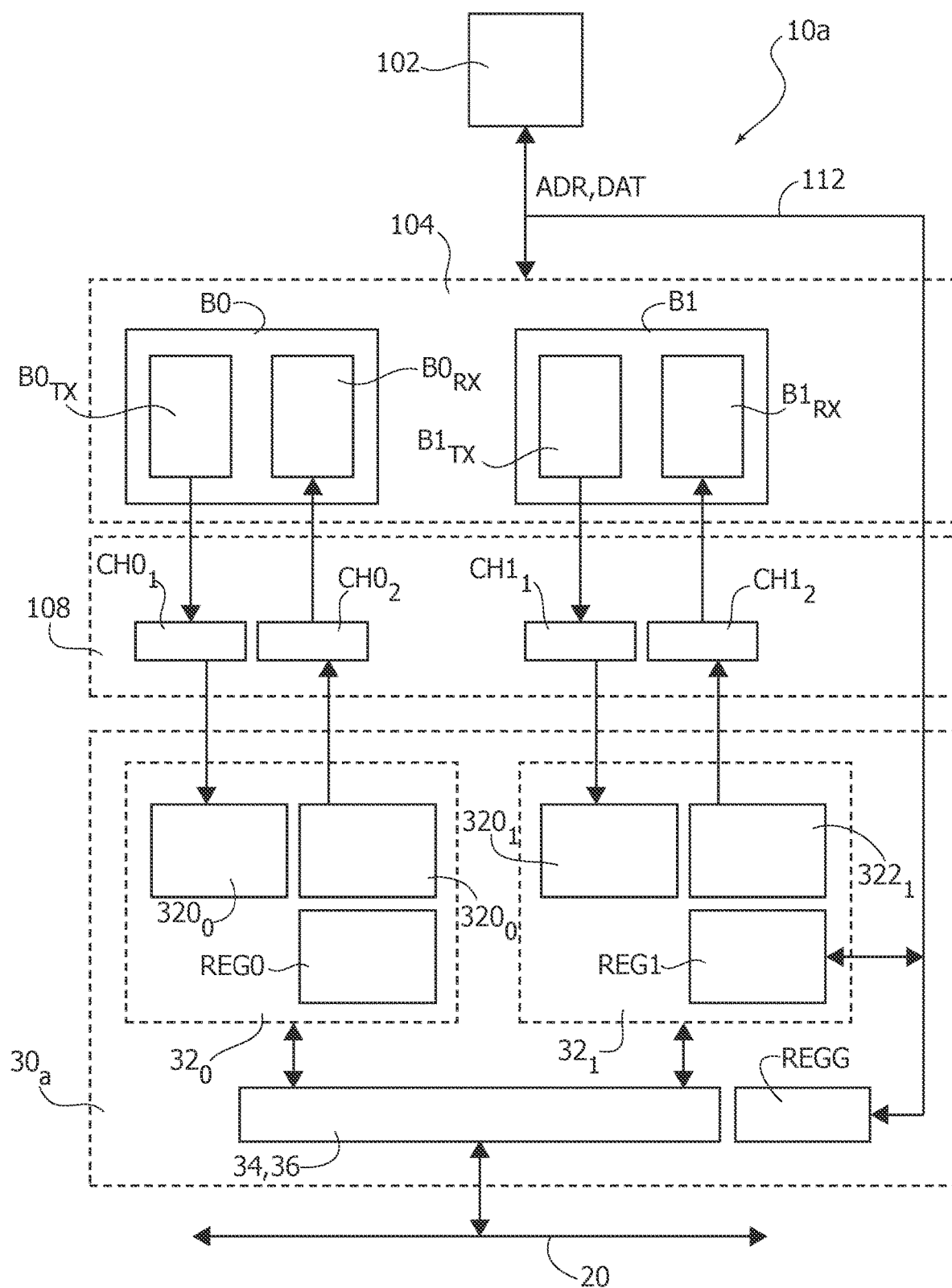
FIG. 11 shows an embodiment of a processing system in accordance with the present disclosure.

FIG. 11 shows in this respect a possible embodiment of a processing system boa and in particular the data flow between the processing circuit 102, such as a microprocessor, and the interface 30a. Without loss of generality are shown just two interfaces $32_0$ and $32_1$.

Specifically, in the embodiment considered, the processing circuit 102 may communicate with a memory 104, such as a RAM, in any suitable manner, e.g., by using an address signal ADR and a data signal DAT, which are transmitted via a bus system 112.

In the embodiment considered, the memory 104 may comprise for each interface 32 a respective memory area, e.g., B0 and B1. Moreover, each of the memory areas comprises a respective transmission sub-area/buffer $B_{TX}$ for storing data to be transmitted and a reception subarea/buffer $B_{RX}$ for storing received data, e.g., $B0_{TX}/B1_{TX}$ and $B0_{RX}/B1_{RX}$, respectively. Accordingly, the processing circuit 102 (or another resource 106 of the processing system 10) may store data to be transmitted to one of the transmission subareas $B_{TX}$, e.g., $B0_{TX}$, and may read received data from the respective reception subarea $B_{RX}$, e.g.,$B0_{RX}$.

In the embodiment considered, the memory 104 is also connected to the interface 30a, in particular the transmission and reception queues, via a suitable communication channel. Specifically, in various embodiments, each transmission memory subarea (e.g., $B0_{TX}$ and $B1_{TX}$) is connected to a respective transmission queue (e.g., $320_0$ and $320_1$) via a respective Direct Memory Access (DMA) channel (e.g., $CH0_1$ and $CH1_1$), and each reception memory subarea (e.g., $B0_{RX}$ and $B1_{RX}$) is connected to a receptive reception queue (e.g., $322_0$ and $322_1$) via a respective DMA channel (e.g., $CH0_2$ and $CH1_2$). Accordingly, in various embodiments, data exchange between the memory 104 and the interface 30a is based on separate DMA channels.

As shown in FIG. 11, in various embodiments, the processing circuit 102 may also communicate with one or more configuration registers REGG, REG0 and REG1 of the interface 30a. For example, communication with these registers may be performed via the above-mentioned bus 112, e.g., by using the address signal ADR and the data signal DAT. For example, in various embodiments, given address ranges may be associated with the memory 104, in particular the memory sub-areas $B_{TX}$ and $B_{RX}$, and the registers of the interface 30a. Specifically, in the embodiment considered, the address range associated with the registers comprises:
 a first address range associated with a plurality of registers REGG for exchanging global/common configuration and/or status data of the interface 30a; and
 for each of the interfaces $32_0 \ldots 32_n$, a respective address range associated with a plurality of respective registers (e.g., REG0 and REG1) used to exchange configuration and/or status data with the respective interface (e.g., $32_0$ and $32_1$).

Accordingly, a memory controller of the processing circuit 102 (e.g., used to generate the address signal ADR and data signal DAT), or a hypervisor HYP and/or operating system OS executed by the processing circuit 102 may limit the access to the interfaces $32_0 \ldots 32_n$ by limiting the access to the addresses or address ranges associated with the memory sub-areas $B_{TX}$ and $B_{RX}$, the global registers REGG and the individual registers (REG0 and REG1)

Figure 12:
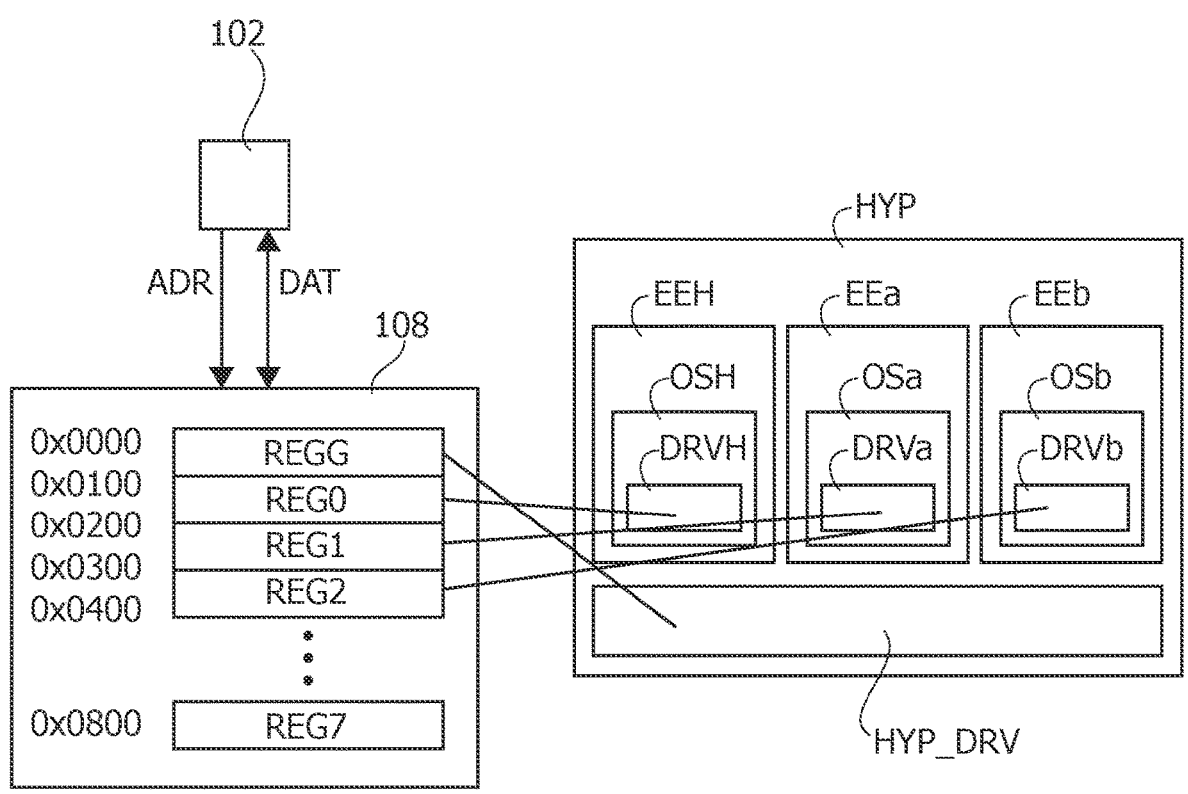
FIG. 12 shows a third embodiment of the software layers of the software executed by a processing system.

For example, FIG. 12 shows an embodiment of the organization of the address ranges. Specifically, in the embodiment considered, the processing circuit 102 uses again an address signal ADR and a data signal DAT to access the global registers REGG and the individual registers, e.g., eight registers REG0 . . . REG7 in the example considered. For example, in the embodiment considered, the following addresses are used: 0x0000 . . . 0x0FF for the registers REGG, 0x0100 . . . 0x01FF for the registers REG0, 0x0200 . . . 0 . . . x02FF for the registers REG1, 0x300 . . . 0x03FF for the registers REG2, etc. Generally, also a fixed offset may be added to these addresses.

Accordingly, each of the global registers REGG and the individual registers may be assigned to a given driver, e.g., the previously mentioned drivers HYP_DRV, DRVH, DRVa and DRVb, by limiting the memory access of each of the execution environments to a given address ranges, such as:
 the hypervisor HYP has (privileged) access and may access the address range (e.g., 0x0000 . . . 0x00FF) associated with the global registers REGG, and optionally also the address range (e.g., 0x0100 . . . 0x08FF) associated with the individual registers;
 each execution environment or even each software task executed by an execution environment may not access the address range (e.g., 0x0000 . . . 0x00FF) associated with the global registers REGG, and may only access a subset of the address ranges (e.g., 0x0100 . . . 0x01FF, and 0x0300 . . . 0x3FF) associated with a respective subset of individual registers, while access to the address ranges of the other interfaces 32 is inhibited.

As mentioned before, the access control may be enforced by a hardware or software memory protection, which may be configured by:
 a) the hypervisor, optionally via the host environment used to configure the hypervisor, thereby limiting access to given interfaces $32_1 \ldots 32_n$ for the execution environments EEH, EEa, EEb and/or
 b) the operating system OSH, OSa, OSb executed by a given execution environment EEH, EEa, EEb, thereby limiting access to given interfaces $32_1 \ldots 32_n$ for software tasks executed by the respective operating system OSH, OSa, OSb.

As described in the foregoing (see e.g., FIG. 8), plural interfaces $32_1 \ldots 32_n$ may use the same hardware SPI communication interface 36 by exchanging data with the hardware SPI communication interface 36 via an arbiter/scheduler 34.

As mentioned before, preferably the arbitration is performed based on priorities. In various embodiments, the priority may be specified, e.g., by at least one of:
 by storing first priority data in the global registers REGG, whereby the priority is specified for each interface $32_1 \ldots 32_n$, e.g., via the hypervisor HYP;
 by storing second priority data in an individual registers REG1 . . . REG7, where the priority is specified for each interface $32_1 \ldots 32_n$; e.g., via the driver executed by a given operating system; and by storing third priority data in the transmission buffer $B_{TX}$ together with the respective data to be transmitted, where the priority is specified for each data packet or sequence of data packets to be transmitted, e.g., via the driver executed by a given operating system.

Accordingly, in various embodiments, the proposed SPI interface circuit 32a may be used by independent software tasks, both in a conventional software environment with single operating system (FIG. 9) and in a virtual/hypervisor environment (FIG. 10). In various embodiments, access to the separate interfaces $32_1 \ldots 32_n$ may be controlled for each execution environment and/or each software task. Moreover, the priority handling may be performed directly at a hardware layer 34, e.g., as a function of data identifying the execution environment, the software task (e.g., linked to a given slave device), or even the single transmission requesting the transmission of data.

In various embodiments, the registers associated with a given interfaces $32_1 \ldots 32_n$ and the global registers REGG are grouped in a consecutive address ranges, which simplifies the implementation of a memory access to these respective registers.

In the following is now described a possible detailed implementation of the SPI communication interface circuit 32a. Such a circuit 32a may have one or more of the following features:

the interface 32a may be configured as master or slave device;

support of up a given number of transfer groups/interfaces 32, such as eight interfaces $32_0 \ldots 32_7$, wherein each transfer group/interface 32 may support one or more of:

buffered operation with a given number of entries in the TX and RX FIFOs 320 and 322;

DMA interfaces to the TX and RX queues 320 and 322;

the transmission may be initiation via software control and/or based on at least one (programmable) hardware trigger generated by another hardware resource of the processing system (e.g., a pin/pad or a resource 106);

a status of the received data may be provided, which may include one or more of: a parity error, a CRC error, an end-of-queue status, the used chip select signal, a timestamp;

burst mode may be supported, wherein a transmission frame comprises a plurality of data packets to be transmitted;

priority based arbitration between transfer groups used to determine the next frame to be transferred;

programmable global and/or individual SPI transfer attributes, such as:

programmable clock polarity and phase;

programmable delays, e.g., between the signal PCS and the clock signal SCK (delay between instants $t_1$ and $t_2$ and/or $t_5$ and $t_6$), and/or between data packets within a frame; and programmable size of the data packets of a frame to be transmitted/received, e.g., between 4 to 32 bits.

Figure 13:
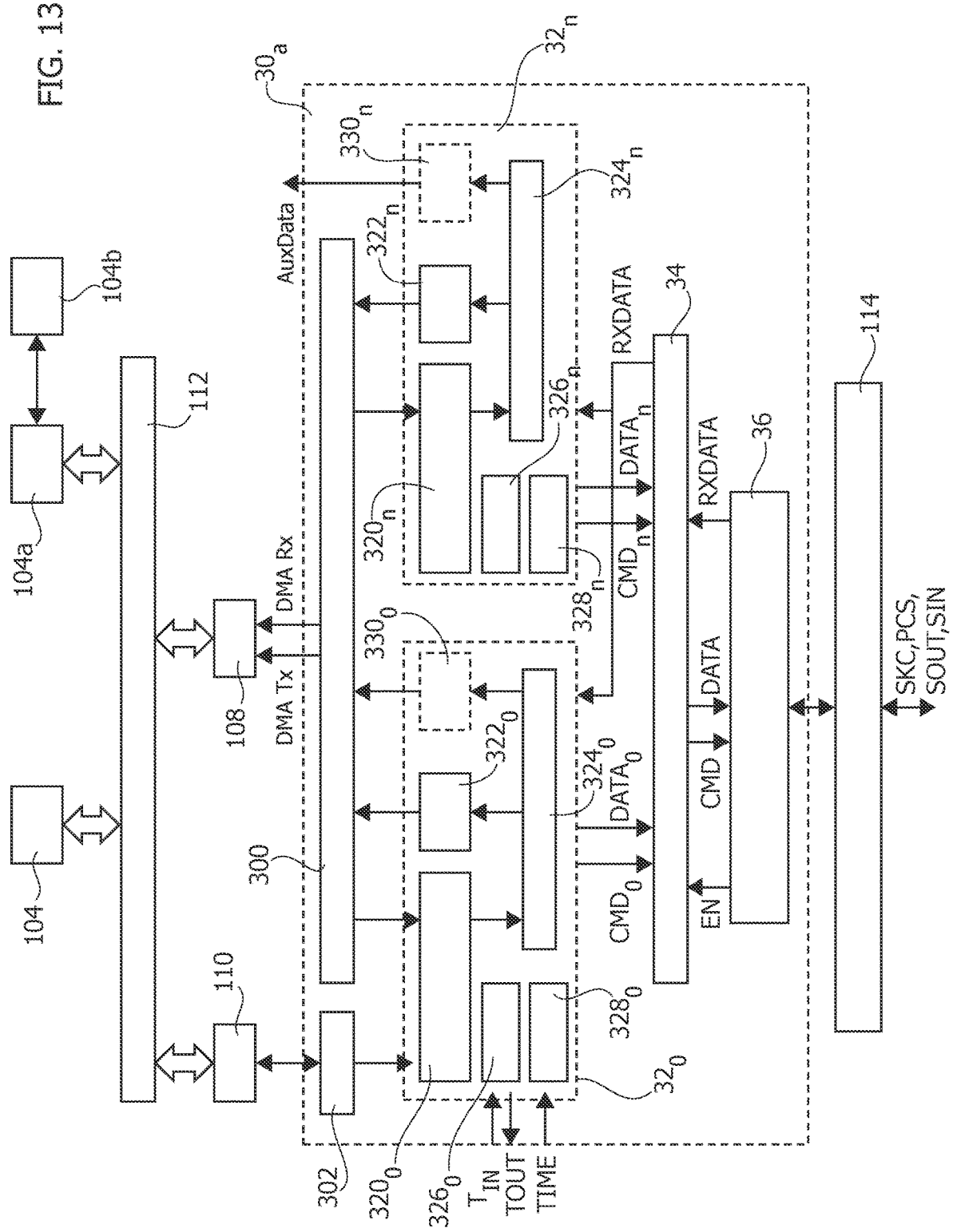
FIG. 13 shows a further embodiment of a processing system in accordance with the present disclosure.

FIG. 13 shows an embodiment of the SPI communication interface 30a, which again comprises a given number of interfaces $32_0 \ldots 32_n$, and arbiter 34 and a hardware SPI transmitter/receiver circuit 36, wherein each interfaces $32_0 \ldots 32_n$ comprises a transmission queue 320 and a reception queue 322.

As mentioned before, the SPI interface circuit 32a is connected via a suitable communication interface to the processing circuit 102. For example, in the embodiment considered, the SPI interface circuit 32a comprises:

a DMA interface 300 configured to manage a plurality of DMA channels DMA_Tx and DMA_Rx, wherein each transmission queue 320 and reception queue 322 may have associated a respective DMA channel; and a bus slave interface 302 configured to connect the SPI interface 30a to a bus system 112 of the processing system 10, e.g., for connection to the processing system 102.

For example, in various embodiments, the bus slave interface 302 and the DMA interface 300 follow the Advanced Microcontroller Bus Architecture (AMBA), wherein the DMA interface 300 is connected to an AMBA or AMBA High-performance Bus (AHB) 112 via the DMA controller 108, and the bus slave interface 302 is an Advanced Peripheral Bus (APB) slave connected to a APB bus connected in turn to the AMBA or AHB bus via a bridge circuit no. In this case, the processing circuit 102 is connected to the AMBA or AHB bus 140. Similarly, the one or more memories 104 may be connected to the bus 112 via one or more memory controllers 104a. For example, the memory may be the non-volatile program memory of the processing circuit 102 or a volatile memory 104b, such as a Random-Access-Memory (RAM).

In the embodiment considered, each interface $32_0 \ldots 32_n$ comprises a respective transmission queue $320_0 \ldots 320_n$ and a respective reception queue $322_0 \ldots 322_n$. In various embodiments, each interface $32_0 \ldots 32_n$ comprises also a respective interface control circuit $324_0 \ldots 324_n$ configured to manage the data exchange with the arbiter 34. Specifically, as will be described in greater detail in the following, each control circuit 324 is configured to read the content of the respective transmission queue 320 and extract a command CMD and the respective data DATA to be transmitted, i.e. the processing circuit 102 (or any other circuit requesting the transmission of data) provides (e.g., via the DMA controller 108 and the DMA interface 300) to a respective interface 32 one or more data packets, which are stored to the respective transmission queue 320, wherein the one or more data packets comprises a command CMD and respective data DATA. Accordingly, the control circuit 324 may be configured to extract the command and data, and provide this information to the arbiter 34. For example, this is schematically shown in FIG. 13, wherein the interfaces $32_0 \ldots 32_n$ provide command signals $CMD_0 \ldots CMD_n$ and data signals $DATA_0 \ldots DATA_n$ to the arbiter 34. Conversely, the arbiter 34 provides to the hardware SPI interface 36 the selected commands CMD and data DATA. Accordingly, the hardware SPI interface transmits the data DATA as a function of the command CMD and optionally receives respective data RXDATA, which are forwarded to the arbiter 34. In the embodiment considered, the arbiter 34 provides the received data RXDATA thus to the interfaces $32_0 \ldots 32_n$.

In various embodiments, the hardware SPI interface 36 may be connected to the pins/pads of the processing system 10 via a routing circuit 114, such as a configurable crossbar.

In various embodiments, each interface $32_0 \ldots 32_n$ may comprises also a trigger management circuit $326_0 \ldots 326_n$, which is configured to e.g.:

receive a trigger signal TIN from another circuit of the processing system 10 and signal a transmission request to the arbiter; and/or generate a trigger signal TOUT in response to the completion of a transmission/reception.

In various embodiments, each interface $32_0 \ldots 32_n$ may comprises also a timestamp management circuit $328_0 \ldots$ $328_n$. Specifically, this timestamp management circuit 328 may be configured to store a timestamp signal TIME in response to the start of the transmission (as signaled by the trigger management circuit 326 or preferably the actual start of transmission as signaled by the arbiter 34) or the end of the reception of data (as signaled by the arbiter 34).

Generally, the above operation applies when the circuit 32a is configured as master device. However, in various embodiments, the circuit 32a may also be configurable as slave device. Accordingly, in this case, the hardware SPI interface 36 may generate an enable signal EN, indicating that data RXDATA have been received and that these data should be stored to a predetermined queue, e.g., the queue $320_0$. For example, when operated in slave mode, the hardware SPI communication circuit 36 may monitor the slave select signal PCS[0] and the signal SCK, and when enabled via the slave select signal PCS[0], the SPI communication circuit 36 may store the logic level of the signal SIN in response to the clock signal SCK.

Accordingly, in the embodiment considered, the circuit 30a provides multiple queue interfaces $32_0 \ldots 32_n$ for buffering SPI sequences. Each queue represents a transfer group and implements FIFOs to transmit and receive data to and from external devices. As will be described in greater detail in the following, the TX FIFO 320 may be configured to store SPI commands and data to be transferred while the RX FIFO 322 buffers incoming serial data. In various embodiments, the number of entries of the queues and/or the number of bits of each entry may be configurable.

In various embodiments, also longer SPI sequences may be stored in a memory external to the SPI interface circuit 30a, e.g., the memory 104b. In this case, data transfers between the memory and the SPI interface circuit 30a may be accomplished automatically through the DMA controller 108 and/or via software instructions executed by the processing circuit 102.

Specifically, in various embodiments, the SPI interface 30a supports a master mode and a slave mode. In the master mode the interface 32a initiates and controls serial communication. In this mode, the clock signal SCK and the slave select signals PCS[m:0] are configured as output and generated by interface 30a. In SPI master mode, each SPI frame to be transmitted may comprise a command CMD associated with the respective data DATA allowing to specify given transfer attributes on a frame by frame basis. Conversely, the data DATA of a frame are loaded from the transmission FIFO 320 into the transmission shift register 360 and shifted out on the Serial Out pin SOUT. At the same time, the serial data input on the Serial In pin SIN is shifted in the reception shift register 360 (which may also correspond to the transmission shift register) and stored as a data entry in the reception FIFO 322.

Conversely, in various embodiments, the slave mode may permit the SPI interface 30a to communicate with a SPI bus masters. In this mode the SPI interface 30a responds to externally controlled serial transfers. The SCK signal and a given slave select signal, e.g., PCS[0], are configured as inputs and driven by a SPI bus master. Certain transfer attributes such as clock polarity, clock phase and frame size may be programmable also in this case.

Accordingly, in various embodiments, when operating as master device, the transmission FIFO 320 is configured to receive a frame comprising:
a first entry comprising a command CMD; and
one or more entries comprising the data to be transmitted.
In various embodiments, both in the master and slave mode, the reception FIFO 322 is configured to receive a frame comprising one or more entries comprising the received data. As will be described in greater detail in the following, optionally each frame or each received data packet may also comprise a last entry comprising a status RxSTATUS indicating the status of the received data.

As mentioned before, in various embodiments, the SPI interface 30a may comprise a set of global registers REGG and a set of individual registers REG0 . . . REGn in order to control the operation of the SPI interface 30a, in particular the arbiter 34 and the hardware SPI communication interface 36. Preferably these registers are accessible via the bus slave interface 302, e.g., via respective addresses.

For example, in various embodiments, the global registers REGG may comprise one or more of the following registers:
MCR: Module configuration register;
HW_CONFIG_STATUS: HW configuration status register;
GLOBAL_STATUS: Global status register;
GLOBAL_IRQ_CTRL: Global interrupt control register;
GLOBAL_IRQ_STATUS: Global interrupt status register;
TAC[k:0]: Set of transfer attribute control registers, wherein one or more registers TAC (such as two registers TAC_L and TAC_H) are associated with each interface $32_0 \ldots 32_n$; and
MONITOR_SLAVE_SELECT: Monitor slave select register.

Conversely, each interface $32_0 \ldots 32_n$ may have associates individual registers $REG_0 \ldots REG_n$, which may comprise a queue control, status and optionally interrupt registers. For example, the queue control, status and interrupt registers may comprise one or more of the following registers:
Q_SETUP: Queue setup register;
Q_HW_CFG: Queue hardware configuration register;
Q_STATUS: Queue status register;
Q_CTRL: Queue control register;
Q_IRQ_CTRL: Queue interrupt control register; and
Q_IRQ_STATUS: Queue interrupt status register;
In various embodiments, each interface $32_0 \ldots 32_n$ may have associates also further optional individual registers $REG_0 \ldots REG_n$, such as one or more of the following registers:
Queue FIFO Push/Pop registers;
Queue debug registers; and
Queue CRC register.

For example, in various embodiments, a queue FIFO Push register Q_TxFIFO_PUSH and a queue FIFO Pop register Q_RxFIFO_POP may be used to temporarily store the data (received via the interface 300 and) to be stored to the transmission FIFO 320 and the data read from the reception FIFO memory 322 (and to be transmitted via the interface 300). For debug purposes it may thus be useful to have access to these registers.

Generally, these registers may also be used to directly transmit data packets to a given interface 32 (e.g., by storing data to the register Q_TxFIFO_PUSH, which are then written to the respective transmission FIFO 320) and read data packets from the given interface 32 (e.g., by reading data from the register Q_RxFIFO_POP, which then is refilled by reading a new data packet from the reception FIFO 322). Accordingly, in various embodiments, data exchange between the processing circuit 102 and the interface 30a (of data frames to be transmitted or received) may be accomplished directly via the registers Q_TxFIFO_

PUSH and Q_RxFIFO_POP of a given queue, or indirectly via the respective buffer $B_{TX}$ and $B_{RX}$ and using a DMA transfers.

Conversely, the queue debug registers may comprise one or more of the following registers:
- Q_TxFIFO_PTR: Queue transmission FIFO pointer register;
- Q_RxFIFO_PTR: Queue reception pointer register.

Additionally or alternatively, also a full debugging of the FIFO memories 320 and 322 may be possible, which may include a read and/or write access to each entry of the FIFO memories 320 and/or 322. For example, in various embodiments, the queue debug registers may comprise further the following registers:
- Q_DEBUG_PTR: Queue debug pointer register;
- Q_DEBUG_TxFIFO_DATA: Queue debug data of transmission register (as selected via the signal pointer Q_DEBUG_PTR); and
- Q_DEBUG_RxFIFO_DATA: Queue debug data of reception register (as selected via the signal pointer Q_DEBUG_PTR).

In various embodiments, the queue debug registers may comprise also a queue command register Q_DEBUG_TxFIFO_CMD indicating the last or ongoing command CMD.

As mentioned before, in various embodiments, the hardware SPI interface may also be configured to selectively perform an error verification operation, such as a parity or CRC verification of the received data. In this case, the queue CRC register may comprise one or more of the following registers:
- Q_CRC_CFG: Queue CRC configuration register;
- Q_CRC_INIT: Queue CRC initialization register;
- Q_CRC_POLY: Queue CRC polynomial register;
- Q_CRC_TX: Queue CRC transmission register; and
- Q_CRC_RX: Queue CRC reception register.

In the following will now be described possible implementations of the above-mentioned registers. Generally, the description is only for the scope of illustration in order to show how the configuration of given function of the SPI interface 30*a* may be implemented. However, one or more of the configuration registers or fields thereof may be purely optional (insofar as the respective configuration may also be fixed at a hardware level), the configuration may also be implemented with other registers, or the fields of the registers may be organized in a different manner. Similarly, by way of example will be shown, which entries may be readable and/or writeable, indicated laterally with a "R" and a "W", and possible reset values for the respective bits, indicated with "Reset".

For example, FIG. 14 shows an embodiment of the module configuration register MCR. In the embodiment considered, the register MCR comprises the following fields (which are accordingly processed by the interface 30*a*):
- MSTR: permits to selected whether the SPI interface 30*a* operates in the master mode or slave mode;
- CONT_SCKE: permits to select whether the clock signal SCK is non continuous i.e. generated only during frame transfer, or continuous;
- PCS_DEFAULT_LEVEL: permits to select the inactive level of each slave select signal, e.g., PCS[x] inactive level is 0 or 1;
- SAFE_SPI_MODE: permits to select whether a SafeSPI mode is enabled or not;
- SAMPLE_POINT: permits to specify when the SPI master samples the signal SIN and generates the signal SOUT;
- MTFE: permits to specify whether to enable or disable a modified timing format;
- DEBUG_FREEZE: permits to specify whether a transmission/reception operation of the SPI interface 30*a* is stopped or not in response to a debug request;
- LOOPBACK_EN: permits to enable or disable an internal loopback, wherein the signal SIN is selectively connected (internally) to the signal SOUT;
- CRC_ERR_STOP: permits to specify whether data transmission is interrupted or not when a CRC error occurs;
- PAR_ERR_STOP: permits to specify whether data transmission is interrupted or not when a parity error occurs;
- MODULE_EN: permits to enable or disable the SPI interface 30*a*.

As mentioned before, the field SAMPLE_POINT permits to specify the transfer format of the signals SIN and SOUT. For example, in various embodiments (as will be described in the following) the clock polarity and phase may be specified via respective fields CPOL and CPHA for each interface $30_0 \ldots 30_n$, e.g., via a respective flag in the register TAC_H (which will be described in greater detail in the following). In this case, the field SAMPLE_POINT may only specify the properties of the signals SIN and SOUT. For example, when the flag CPHA is set to low for a given $30_0 \ldots 30_n$, the hardware SPI interface 36 may sample the signal SIN and drive the signal SOUT according to the following bit values of the field SAMPLE_POINT:
- 00: SIN is sampled on even SCK edge, and SOUT is driven on odd SCK edge; and
- 01: SIN is sampled one system clock before even SCK edge, and SOUT is driven one system clock after odd SCK edge.

Conversely, when the flag CPHA is set to high for a given $30_0 \ldots 30_n$, the hardware SPI interface 36 may sample the signal SIN and drive the signal SOUT according to the following bit values of the field SAMPLE_POINT:
- 00: SIN is sampled on odd SCK edge, and SOUT is driven on even SCK edge;
- 01: SIN is sampled one system clock before odd SCK edge, and SOUT is driven one system clock after even SCK edge.

FIG. 15 shows an embodiment of the hardware configuration status register HW_CONFIG_STATUS. In the embodiment considered, the register HW_CONFIG_STATUS comprises the following (read-only) fields (which are accordingly generated by the interface 30*a*):
- NUM_TAC: provides the number of Transfer Attribute Control (TAC) registers fixed during design;
- NUM_QUEUES: provides the number of interfaces $32_0 \ldots 32_n$ fixed at design.

FIG. 16 shows an embodiment of the global status register GLOBAL_STATUS. In the embodiment considered, the register GLOBAL_STATUS comprises the following (read-only) fields (which are accordingly generated by the interface 30*a*):
- QUEUE_NUM: specifies for each interface $32_0 \ldots 32_n$ whether a status is reported (1) or not (0);
- SPIQ_STATUS: provides the status message, such as:
- IDLE (000): all queues are idle.
- RUNNING (001): SPI transfer ongoing
- WAIT_TRIGGER (010): no SPI transfer ongoing, all enabled queues waiting for trigger
- SUSPENDED (011): all queues in suspended state;
- ERROR (111): at least one queue is reporting an error state (such as UNDERFLOW, STALLED, FIFO underrun, FIFO overrun, parity error, CRC error, trigger overrun error).

FIG. 17 shows an embodiment of the global interrupt control register GLOBAL_IRQ_CTRL. In the embodiment considered, the register GLOBAL_IRQ_CTRL comprises the following fields (which are accordingly processed by the interface 30a):

ERR_IRQ_EN: permits to enable or disable error interrupts for each individual interfaces $32_0 \ldots 32_n$;

STATUS_IRQ_EN: permits to enable or disable status interrupts for each individual interfaces $32_0 \ldots 32_n$.

FIG. 18 shows an embodiment of the global interrupt status register GLOBAL_IRQ_STATUS. In the embodiment considered, the register GLOBAL_IRQ_STATUS comprises the following (read-only) fields (which are accordingly generated by the interface 30a):

ERR_IRQ_STATUS: provides the error interrupt value for each individual interfaces $32_0 \ldots 32_n$;

STATUS_IRQ: provides the status interrupt value for each individual interfaces $32_0 \ldots 32_n$.

Figure 19:
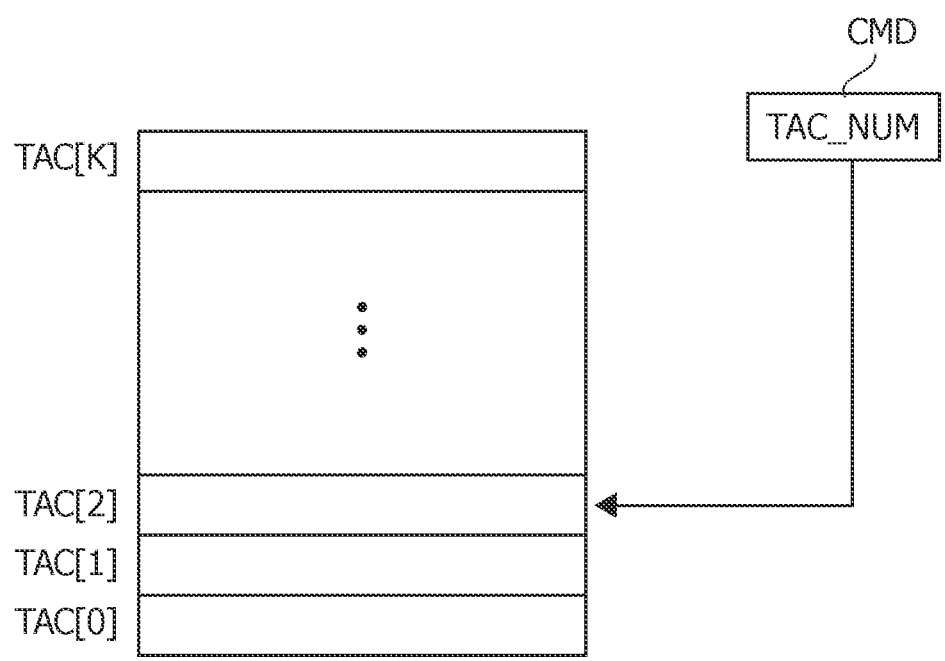
FIG. 19 shows an embodiment of the configuration of the properties of a SPI communication.

As mentioned before, in various embodiments, the configuration of the hardware SPI interface is based on given transfer attributes. Specifically, as shown in FIG. 19, in various embodiments, instead of specifying all transfer attributes in the command field CMD, the SPI interface 30a comprises a plurality of registers TAC[k:0] having stored given transfer attributes, and the command field CMD comprises only a field TAC_NUM having stored the number i of one of the registers TAC[k:0], i.e. i=0 ... k.

For example, in various embodiments, each register TAC[k:0] is implemented with two addressable registers TAC_L[k:0] and TAC_H[k:0].

FIGS. 20 and 21 shows an embodiment of the registers TAC_L[k:0] and TAC_H[k:0]. In the embodiment considered, each register TAC_L[k:0] comprises the following fields (which are accordingly processed by the interface 30a):

DBR, PBR and BR: permits specifying of a baud rate, i.e. the frequency of the clock signal SCK;

PLD and LD: permits specifying of the delay between assertion of the slave select signal PCS and the first edge of the SCK, e.g., in number of cycles of the signal SCK;

PTD and TD: permits specifying of the delay between the last edge of the signal SCK and the negation of the slave select PCS, e.g., in number of cycles of the signal SCK;

PNFD and NFD: permits specifying of the delay between the negation of the slave select signal PCS signal at the end of a frame and the assertion of the slave select signal PCS at the beginning of the next frame, e.g., in number of cycles of the signal SCK; and PIWD and IWD: permits specifying of the delay between the last bit transfer of a word and the first bit transfer of the next word in a continuous PCS select mode, e.g., in number of cycles of the signal SCK.

In the embodiment considered, each register TAC_H[k:0] comprises the following fields:

CPOL: permits to select the inactive state of the Serial Communications Clock (SCK), i.e. high or low;

CPHA: permits to select which edge of the signal SCK causes data to change and which edge of the signal SCK causes data to be captured, i.e. the clock signal of the register(s) 360, e.g., low may indicate that the signal SIN is captured on the leading/rising edge of the signal SCK and the signal SOUT is changed on the following (falling) edge, while high may indicate that the signal SOUT is changed on the leading/rising edge of the signal SCK and the signal SIN is captured on the following (falling) edge;

LSBFE: permits to select the shift direction of the register(s) 360, i.e. data is transferred MSB first (0) or LSB first (1);

SCK_DISABLE_CYCLES: permits to specify the delay between the polarity setup of the signal SCK and the assertion of the slave select signal PCS, e.g., in number of cycles of the signal SCK;

FMSZ: permits to select the number of bits transferred per frame, e.g., between 4 and 32 bits;

DTC: permits to specify a data transfer count per command entry, i.e. the number of data words following a command, e.g., between 1 and 65536.

FIG. 22 also shows an embodiment of the register TAC_H, e.g., the register TAC_H[0], when the SPI interface 30a is operated as slave, identified in the following as TAC_H_SLAVE. Specifically, compared to FIG. 21, in this case, the fields LSBFE, SCH_DISABLE_CYCLES and DTC are not used, but the register may comprise the following fields:

PE: permits to select whether parity bit transmission and reception per frame is enabled or disabled;

PP: permits to specify the polarity of the parity, e.g., the number of bits set to "1" is even or odd, wherein the control circuit 362 may set a respective flag in the field Q_IRQ_STATUS to the status PAR_ERR, when the parity calculated as a function of a received frame does not correspond to the field PP.

FIG. 23 shows an embodiment of the monitor slave select register MONITOR_SLAVE_SELECT. Specifically, this register may be used to specify whether a monitor SPI, such as an error logging module, is connected to one of the slave select lines along with the respective slave select number. For example, in the embodiment considered, each register MONITOR_SLAVE_SELECT comprises the following fields:

MONITOR_SPI_CONNECTED: permits to specify whether a monitor SPI module is connected or not; and MONITOR_SPI_SLAVE_SELECT: permits to specify for each slave select line PCS[k:0] whether a monitor SPI module is connected to the respective slave select line.

For example, the content of the register MONITOR_SLAVE_SELECT may be used by the processing circuit 102 or an error detection/collection module of the processing system 10 to automatically send status and/or error messages to the external monitor SPI module.

Accordingly, the previous registers essentially permits specifying of the global configuration of the hardware SPI communication circuit 36, and a series of predetermine transmission configurations TAC[k:0]. Optionally, the registers may also provide additional status and configuration information. In addition to these registers, each interface $32_0 \ldots 32_n$ may have associates individual registers $REG_0 \ldots REG_n$.

For example, FIG. 24 shows an embodiment of the queue setup register Q_SETUP. For example, in the embodiment considered, each register Q_SETUP comprises the following fields (which are accordingly processed by the interface 30a):

PRIORITY: permits to specify the priority of the interface $32_0 \ldots 32_n$, e.g., between 0 (lowest) and n (highest)

TIMESTAMP_NOT_TRANSFER_CNT: permits to specify whether, in response to the reception of data, the SPI interface 30a samples the timestamp TIME (see also the description of the timestamp management circuit 328) and stores the timestamp to the status field RxSTATUS, or stores a transfer count to the status field RxSTATUS;

Rx_STATUS_EN: permits to specify whether the field RxSTATUS should be added to the reception FIFO 322 after each reception of data or not;

HW_TRIG_OUT_WIDTH: permits to specify the properties of the trigger signal TOUT generated via the circuit 326 of the respective queue, such as the number of clock cycles during which the trigger signal is set to high;

RxDMA_EN: permits to specify whether the reception FIFO 322 should generate a DMA request via the DMA controller 300 or not when the number of entries in the reception FIFO 322 exceed a given threshold RxFIFO_THRESHOLD;

RxFULL_STALL_EN: permits to specify whether transmission operations of the hardware SPI interface 36 should be suspended or not when the reception FIFO 322 is full;

RxFIFO_THRESHOLD: permits the threshold for the operation of the flag RxDMA_EN;

TxDMA_EN: permits to specify whether the transmission FIFO 320 should generate a DMA request via the DMA controller 300 or not when the number of entries in the transmission FIFO 320 falls below a given threshold TxFIFO_THRESHOLD;

HW_TRIG_EDGE: permits to specify whether transmission of data should be triggered on a rising edge or falling edge of the signal TIN (see description of trigger circuit 326);

HW_TRIG_EN: permits to specify whether the transmission of the queue is started via a software trigger or via a hardware trigger, i.e. via the signal TIN.

TxFIFO_THRESHOLD permits to specify the threshold for the operation of the flag TxDMA_EN.

Accordingly, in various embodiments, each interface $32_0 \ldots 32_n$ may automatically request new data to be transmitted via and/or transmit received data via a DMA request generated via the interface 300, i.e. each interface $32_0 \ldots 32_n$ may directly read data to be transmitted from a memory 104/104*b* and write received data to the memory 104/104*b* without intervention of the processing circuit 102.

FIG. 25 shows an embodiment of the queue hardware configuration register Q_HW_CFG. For example, in the embodiment considered, each register Q_HW_CFG comprises the following (read-only) fields (which are accordingly generated by the interface 30*a*):

RxFIFO_DEPTH: indicates the number of entries in the reception FIFO 322, such as 2 to 32 words;

TxFIFO_DEPTH: indicates the number of entries in the transmission FIFO 320, such as 2 to 32 words.

FIG. 26 shows an embodiment of the queue status register Q_STATUS. For example, in the embodiment considered, each register Q_STATUS comprises the following (read-only) fields:

TRANSFER_COUNT: indicates the value of a SPI Transfer Counter, which is incremented by the hardware SPI interface 36 every time the last bit of a SPI frame is transmitted, and reset to zero at the beginning of the frame when a field CLR_COUNTER is set in the respective command field CMD;

Q_STATUS: indicates the status of the queue, such as IDLE, RUNNING, WAIT_TRIGGER, SUSPENDED, UNDERFLOW or STALLED;

FIG. 27 shows an embodiment of the queue control register Q_CTRL. For example, in the embodiment considered, each register Q_CTRL comprises the following fields (which are accordingly processed by the interface 30*a*):

Q_FLUSH: permits to reset the queues 320 and 322, and the status registers Q_STATUS;

Q_SW_TRIG: permits to initiate transmission via a software command executed by the processing circuit 102, i.e. this flag represents a software trigger.

FIG. 28 shows an embodiment of the queue interrupt control register Q_IRQ_CTRL. For example, in the embodiment considered, each register Q_IRQ_CTRL comprises the following fields (i.e. the interface 30*a* may be configured to detected one or more of the respective events):

PARITY_ERR_IRQ_EN: permits to enable or disable the generation of an interrupt in response to the detection of a parity error;

CRC_ERR_IRQ_EN: permits to enable or disable the generation of an interrupt in response to the detection of a CRC error;

TRIG_OVERRUN_ERR_IRQ_EN: permits to enable or disable the generation of an interrupt in response to the detection of a trigger overrun;

COMMAND_ERR_IRQ_EN: permits to enable or disable the generation of an interrupt in response to the detection of a command error, i.e. a command CMD comprising invalid data;

EOS_IRQ_EN: permits to enable or disable the generation of an interrupt in response to the detection of the end of sequence comprising a plurality of frames;

FRAME_END_IRQ_EN: permits to enable or disable the generation of an interrupt in response to the detection of the end of a frame;

RXFIFO_OVERRUN_IRQ_EN: permits to enable or disable the generation of an interrupt in response to the detection of a reception FIFO overrun;

RXFIFO_UNDERRUN_IRQ_EN: permits to enable or disable the generation of an interrupt in response to the detection of a reception FIFO underrun;

RXFIFO_FULL_IRQ_EN: permits to enable or disable the generation of an interrupt in response to the detection of a full reception FIFO;

RXFIFO_EMPTY_IRQ_EN: permits to enable or disable the generation of an interrupt in response to the detection of an empty reception FIFO;

RXFIFO_THRESH_IRQ_EN: permits to enable or disable the generation of an interrupt in response to the detection that the number of entries in the reception FIFO exceed the previous described threshold;

TXFIFO_OVERRUN_IRQ_EN: permits to enable or disable the generation of an interrupt in response to the detection of a transmission FIFO overrun;

TXFIFO_UNDERRUN_IRQ_EN: permits to enable or disable the generation of an interrupt in response to the detection of a transmission FIFO underrun;

TXFIFO_FULL_IRQ_EN: permits to enable or disable the generation of an interrupt in response to the detection of a full transmission FIFI;

TXFIFO_EMPTY_IRQ_EN: permits to enable or disable the generation of an interrupt in response to the detection of an empty transmission FIFO; and TXFIFO_THRESH_IRQ_EN: permits enabling or disabling the generation of an interrupt in response to the detection that the number of entries in the transmission FIFO falls below the previous described threshold.

FIG. 29 shows an embodiment of the queue interrupt status register Q_IRQ_STATUS. For example, in the embodiment considered, each register Q_IRQ_STATUS comprises the following fields (i.e. the interface 30a may be configured to generate one or more of the following interrupts based on the enable flags of the register Q_IRQ_CTRL):

PARITY_ERR: SPI Parity Error Flag, which is set when a SPI frame with parity error (as detected by the SPI interface 36) has been received;

CRC_ERR: SPI CRC Error Flag, which is set when a SPI frame with CRC mismatch (as detected by the SPI interface 36) has been received;

TRIG_OVERRUN_ERR: HW Trigger Overrun Error Flag, which is set when a HW trigger occurs while the previous HW trigger was already pending;

COMMAND_ERR: Command Error, which is set, e.g., when command entry field CMD has a value TAC_NUM being greater than the respective HW parameter configuration.

EOS: End of Sequence Flag, which is set, e.g., when the last bit of a frame having a command field CMD comprising an end-of-sequence indication in a field EOS;

FRAME_END: Frame end interrupt, which is set at the end of each frame;

RXFIFO_OVERRUN_ERR: This flag is set when the reception FIFO 322 is full and new data are ready to be written to the FIFO 322;

RXFIFO_UNDERRUN_ERR: This flag is set when the read interface tries to read data from an empty reception FIFO 320;

RXFIFO_FULL: This flag is set when the reception FIFO 322 is full;

RXFIFO_EMPTY: This flag is set when the reception FIFO 322 is empty;

RXFIFO_THRESH: This flag is set when number of entries in the reception FIFO 322 is greater than or equal to the reception FIFO threshold;

TXFIFO_OVERRUN_ERR: This flag is set when the transmission FIFO 320 is full and another word is written to the register TxFIFO_PUSH;

TXFIFO_UNDERRUN_ERR: This flag is set when the transmission FIFO 320 is empty and the queue is selected for a next word transfer;

TXFIFO_FULL: This flag is set when the transmission FIFO 320 is full;

TXFIFO_EMPTY: This flag is set when the transmission FIFO 320 is empty;

TXFIFO_THRESH: This flag is set when number of free entries in the transmission FIFO 320 is greater than or equal to the transmission FIFO threshold.

As mentioned before, in various embodiments, communication with the transmission FIFO 320 and the reception FIFO 322 occur by storing data to and reading data from a FIFO Push register Q_TxFIFO_PUSH and a queue FIFO Pop register Q_RxFIFO_POP, respectively, e.g., via the interface 302 or the DMA interface 302.

In various embodiments, each transmission FIFO 320 may thus manage a write pointer TxFIFO_WR_PTR which is incremented when data are transferred from the register Q_TxFIFO_PUSH to the transmission FIFO 320, and a read pointer TxFIFO_RD_PTR which is incremented when data are transferred to the arbiter 34. Based on these pointers, the transmission FIFO 320 may also generate a signal TxFIFO_ACTIVE_ENTRIES indicating the number of entries in the transmission FIFO 320 not yet transmitted.

Similarly, in various embodiments, each reception FIFO may manage a write pointer RxFIFO_WR_PTR which is incremented when data are transferred from the arbiter 34 to the reception FIFO 322, and a read pointer RxFIFO_RD_PTR which is incremented when data are transferred from the reception FIFO 322 to the register Q_RxFIFO_POP. Based on these pointers, the reception FIFO 322 may also generate a signal RxFIFO_ACTIVE_ENTRIES indicating the number of entries in the reception FIFO 320 not yet read.

As mentioned before, in various embodiments, one or more of these register and parameters may be readable for debug purpose. For example, FIGS. 30 and 31 show embodiments of the Q_TxFIFO_PTR and Qn_RxFIFO_PTR associated with each interface 32, which permits reading of the following data:

TxFIFO_ACTIVE_ENTRIES;
TxFIFO_WR_PTR;
TxFIFO_RD_PTR;
RxFIFO_ACTIVE_ENTRIES;
RxFIFO_WR_PTR; and
RxFIFO_RD_PTR.

Generally, as mentioned before, these registers relate to the actual parameters used by the transmission and reception FIFOs. In various embodiments, the interface 30a may also support a debug interface which permits to provide a respective read pointer to a FIFO (320, 322) in order to read the respective content of the FIFO. For example, for this purpose may be used the previously mentioned queue debug registers.

Finally, as mentioned before, in various embodiments, the interface 30a, in particular the hardware SPI interface 36, may also be configurable in order to perform an error checking operation, such as a parity check or a CRC check. However, when performing a CRC check, usually a reference polynomial is used to calculate a CRC code. In order to correctly manage the CRC calculation, the interface 30a may thus comprise the previously mentioned registers Q_CRC_CFG, Q_CRC_INT, Q_CRC_POLY, Q_CRC_TX and Q_CRC_RX (which are accordingly processed by the interface 30a).

FIG. 32 shows an embodiment of the queue CRC configuration register Q_CRC_CFG. For example, in the embodiment considered, each register Q_CRC_CFG comprises the following fields:

INV_OUT: permits to specify whether the calculated final CRC value should be inverted or not;

CRC_SIZE: permits to specify the dimension of the CRC field, such as 3 to 32 bits.

FIG. 32 shows an embodiment of the queue CRC configuration register CRC initialization register, which permits to specify an initial value CRC_INI (based on the dimension selected via the field CRC_SIZE) for the calculation of the CRC.

Figure 34:
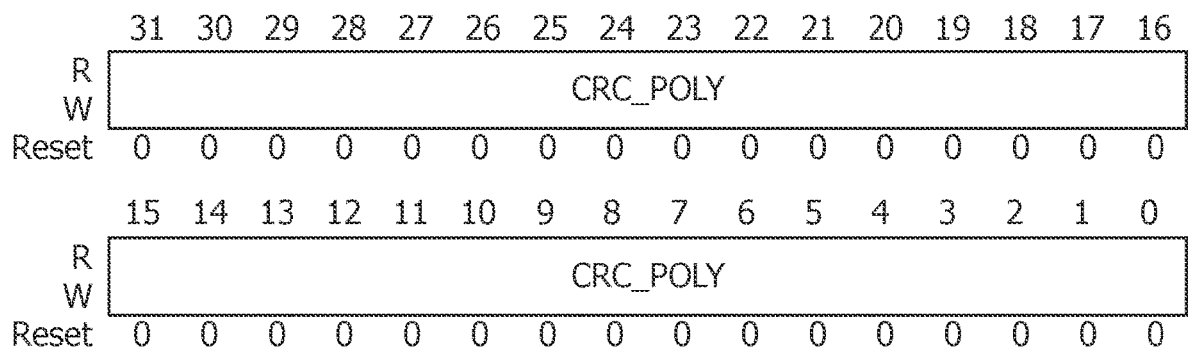

FIG. 34 shows an embodiment of the queue CRC polynomial register Q_CRC_POLY, which permits to for the polynomial CRC_POLY (based on the dimension selected via the field CRC_SIZE), by setting the respective bit to high or low. For example, the polynomial $x^3+x+1$ may correspond to the sequence "1011".

Figure 35:
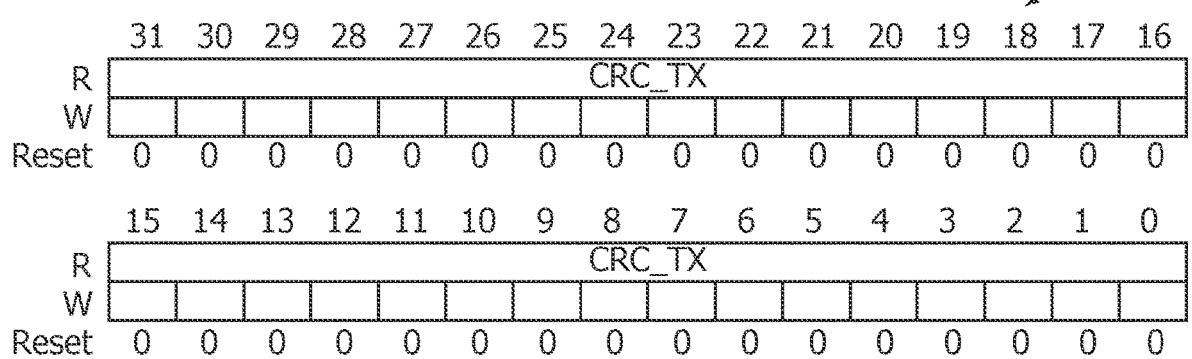
Figure 36:
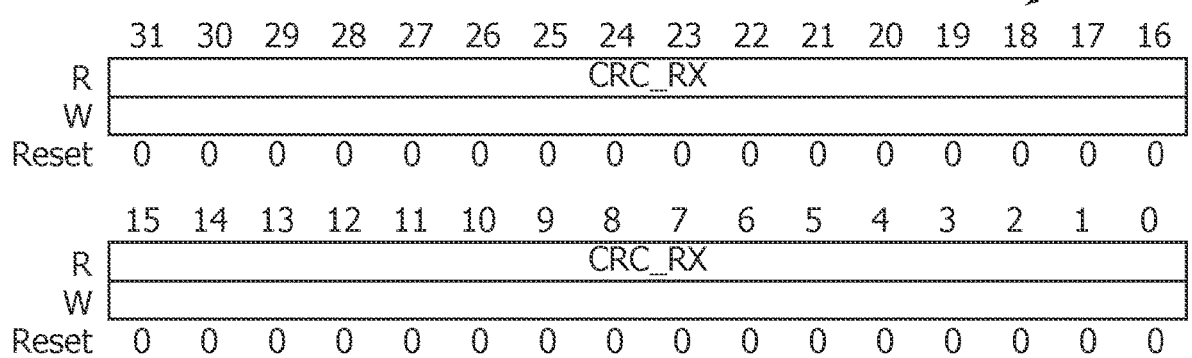

Accordingly, as shown in FIGS. 35 and 36, the interface 30a may also provide for each interface 32 respective registers Q_CRC_TX and Q_CRC_RX having stored the value of the current CRC calculation. Accordingly, the control circuit 362 may comprise a CRC processing circuit which is configured to calculate the values Q_CRC_TX and Q_CRC_RX as a function of the initial value Q_CRC_INT, the polynomial CRC_POLY and the transmitted or received data, respectively.

Accordingly, in various embodiments, the previous described registers permit performing of the configuration of the interface 36 and the interfaces 32, in particular with respect to the transmission attributes TAC[k:0]. Moreover, the registers may optionally be used to perform a debugging of the interface 36 and/or the interfaces 32, e.g., the queue 320 and 322. In this respect, in various embodiments, transmission of data occurs by storing a frame comprising a command CMD and data DATA to the transmission FIFO 320 of an interface 32.

Specifically, in various embodiments, each queue comprises:
- a transmission command and data FIFO 320, e.g., having 32 bits, wherein the number of bits to be transmitted of the data DATA stored to the FIFO 320 may be configurable, e.g., between 1 and 32;
- a reception Data FIFO, e.g., having 32 bits, wherein the number of bits of the received data RXDATA, which are stored to the FIFO 322, may be configurable, e.g., between 1 and 32;
- an optional hardware trigger input TIN managed by the circuit 326;
- an optional hardware trigger output TOUT managed by the circuit 326;
- a transmission DMA interface managed by the DMA interface 300, which may be configured to generate a DMA request signal when the transmission FIFO has a given number of free entries;
- a reception DMA interface managed by the DMA interface 300, which may be configured to generate a DMA request signal when the reception FIFO has a given number of filled entries;
- an optional timestamp input managed by the circuit 328, which may be configured to store to the status RxStatus a timestamp.

Specifically, each transmission FIFO 320 has a given number of (fixed) entries, which may also be stored to the Q_HW_CONFIG register or specified in the manual. The (e.g., 32 bit) entries written to the transmission FIFO form part of a frame comprising a sequence of data packets comprising a command CMD and one or more data values DATA. As mentioned before, in various embodiments, each command entry CMD points to one of the Transfer Attribute control (TAC) register which has a Data Transfer Count (DTC) field. This field determines the number of data entries for the respective frame, e.g., DTC=0 may specify that the command CMD has one data word associated with it and DTC=i may imply i+1 data entries for each command entry. Generally, instead of specifying the field DTC in the TAC registers, the field DTC could also form part of the command field CMD.

For example, FIG. 37 shows an embodiment of the command CMD. For example, in the embodiment considered, each command CMD comprises the following fields (which are accordingly processed by the interface 30a):
- CONT_PCS and DEASSERT_PCS_AFTER_DTC: permit specifying whether the salve select signal PCS is de-asserted or not after end of each data word of a frame and/or each frame, which may be useful for transmitting a sequence of frames, wherein the slave select signal is de-asserted only at the end of the transmission;
- TAC_NUM: permits to specify one of the Transfer Attribute Control register TAC[k:0] to be used for data transfer in master mode (in slave mode, a given TAC may be used, such as TAC[0]);
- EOS: permits to activate the generation of the interrupt EOS in the register Q_IRQ_STATUS, i.e. the flag indicates that the current SPI frame is the last in a sequence;
- CLR_COUNTER: permits to reset the transfer counter field TRANSFER_COUNT in the register Q_STATUS;
- PARITY_EN: permits to enable or disable the generation of a parity bit for transmission, and based on received data for verification;
- PARITY_POLARITY: permits to specify the polarity of the parity bit transmitted and checked (see also the description of the flag PARITY_ERR in the register Q_IRQ_STATUS);
- TRIG_OUT_CONDITION and TRIG_OUT_EN: permit specifying whether and when a trigger signal TOUT should be generated, e.g., at the beginning or at the end of data transfer of a frame;
- SW_TRIGGER and WAIT_TRIGGER: permit specifying whether transmission should be started immediately or, based on the configuration of the field HW_TRIG_EN in the register Q_SETUP, in response to a hardware trigger signaled via the signal TIN or a separate software trigger by programming the field Q_SW_TRIG in the register Q_CTRL;
- DATA_IN_RXFIFO: permits to specify whether the received data should be stored to the reception FIFO memory 322;
- BURST_MODE_EN: permits to enable a burst mode, which signals to the arbiter 34 that a sequence of a plurality of frames should not be interrupted by the arbiter 34;
- CUMMULATIVE_CRC_DTC, CRC_TRANSMIT and CRC_EN: permit specifying whether the CRC should be calculated, whether and when the calculated CRC should be transmitted, e.g., for each word, frame and/or sequence of frames;
- CRC_RST: permits to specify whether the CRC calculation should start from the value stored to the field CRC_INIT; and
- PCS_EN: permits to select which slave select signal should be asserted, e.g., by specifying the value of a respective bit for each slave select signal PCS[m:0].

As mentioned before, for security purposes, given interfaces 32 may also be configured to exchange data only with given slave devices. Accordingly, in this case, a respective field PCS_EN may be associated with each interface 32, and these fields may be stored in a global register.

For example, in various embodiments, a respective field PCS_EN is stored in each transmission attribute TAC[k:0]. In this case, the interface 30a may also be configured to limit the use of the transmission attributes TAC[k:0] for one or more of the interfaces, e.g., by storing in each transmission attribute TAC[k:0] a field indicating which interface 32 may use the respective transmission attributes TAC.

FIG. 38 shows in this respect an example of the entries stored to the transmission FIFO 320. Specifically, in the example considered, the FIFO 320 comprises a first frame comprising a first command CMD0 specifying via the TAC_NUM the transmission attributes TAC[0]. The transmission attributes TAC[0] indicate a number of data words of 1, e.g., DTC=0. Accordingly, the interface 32 expects that the frame comprises one data word D0, which is stored to an entry in the FIFO 320 following the command CMD0, i.e. the interface 32 reads an entry from the FIFO 320 which is provided to the arbiter 34 for transmission. The data word D0 is followed by a second frame comprising a second command CMD1 specifying via the TAC_NUM the transmission attributes TAC[2]. The transmission attributes TAC[2] indicate a number of two data words, e.g., DTC=1. Accordingly, the interface 32 expects that the frame comprises two data words D1 and D2, which are stored to entries in the FIFO 320 following the command CMD1, i.e. the interface 32 reads sequentially two entries from the FIFO 320 which are provided to the arbiter 34 for transmission. Similar, the following frame may comprise a command CMD2 comprising a number TAC_NUM referring to the transmission attributes TAC[1], e.g., specifying the transmission of three data words.

As mentioned before, in various embodiments, the interface 30a may be configured to store to the reception FIFO 322 only the received data or after each data word a respective status entry RxFIFO. For example, FIG. 39 shows an embodiment of the data packet RxFIFO. For example, in the embodiment considered, each status packet RxFIFO comprises the following fields (which are accordingly generated by the interface 30a):

PAR_ERR: indicates whether the received data word has a parity error;
CRC_ERR: indicates whether the received data word has a CRC error;
EOS: is set when the data packet has been received in response to a command CMD where the flag EOS was set;
PCS_NUM: indicates the slave select signal which was set for the received data word;
TIMESTAMP_OR_TRANSFER_COUNT: indicates the timestamp or transfer count of the receive data word (as specified e.g., via the flag TIMESTAMP_NOT_TRANSFER_COUNT in the register Q_SETUP).

Accordingly, the embodiments described herein have the advantage that the various interfaces 32 may be used independently, also with different configurations. For example, in various embodiments, the processing circuit 102 may be configured, e.g., via software instructions, to configure the SPI interface 30a via the following steps:

1. Configure the global registers to set the operating mode (master or slave) and one or more transfer attributes of the registers TAC[k:0];
2. Optionally configure the DMA threshold values for one or more of the transmission and reception FIFOs in the respective queue setup register;
3. Enable the interface 30a, e.g., by setting the field MODULE_EN in the register MCR;
4. Once the module is enabled, the processing circuit 102 may exchange data with the registers Q_TxFIFO_PUSH and Q_RxFIFO_POP or the interfaces 32 generates automatically DMA requests to read data from the buffers $B_{TX}$, and SPI transfers occur based on the read commands and data;
5. To mark the end of a particular queue, the flag EOS of the command field CMD of the last frame should be set.

For example, FIG. 40 shows an example, wherein the interface 30a comprises at least two interfaces $32_0$ and $32_1$, and wherein:

the interface $32_0$ is configured to use the status message RxSTATUS, and to transmit two independent frames each comprising a respective command CMD0, CMD1, wherein the command CMD0 uses a transmission attributes indicating the transmission of one data word TxData0 and the command CMD1 uses a transmission attributes indicating the transmission of one data word TxData1; and
the interface $32_1$ is configured to not use the status message RxSTATUS, and to transmit two independent frames each comprising a respective command CMD0, CMD1, wherein the command CMD0 uses a transmission attributes indicating the transmission of one data word TxData0 and the command CMD1 uses a transmission attributes indicating the transmission of one data word TxData1.

Conversely, FIG. 41 shows an example, wherein the interface 30a comprises again at least two interfaces $32_0$ and $32_1$, and wherein:

the interface $32_0$ is configured to use the status message RxSTATUS, and to transmit a sequence of linked frames, each comprising a respective command CMD0, CMD1, wherein the command CMD0 uses a transmission attributes indicating the transmission of two data words TxData0, TxData1 and the command CMD1 uses a transmission attributes indicating the transmission of two following data words TxData2, TxData3; and
the interface $32_1$ is configured to not use the status message RxSTATUS, and to transmit a sequence of linked frame, each comprising a respective command CMD0, CMD1, wherein the command CMD0 uses a transmission attributes indicating the transmission of three data words TxData0, TxData1, TxData2 and the command CMD1 uses a transmission attributes indicating the transmission of following data words TxData3, etc.

Figure 42:
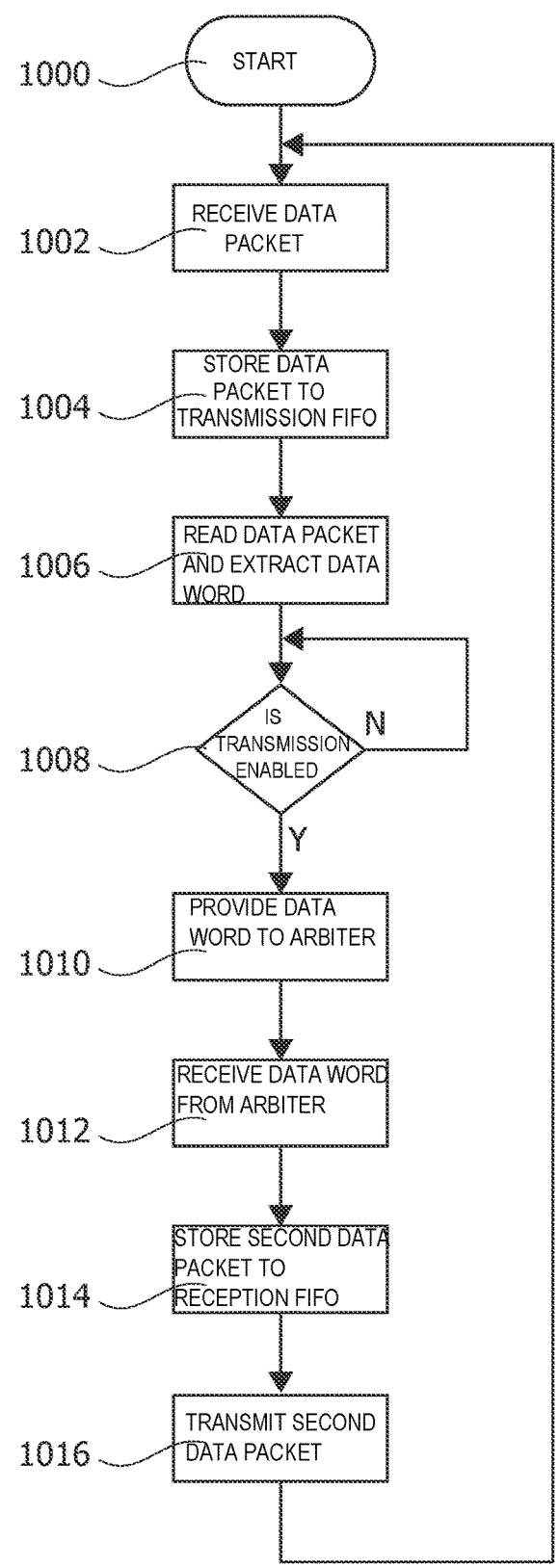
FIG. 42 shows an embodiment of the operation of a control circuit of a SPI communication interface.

FIG. 42 summarize the operation of various embodiments of the interface control circuit 324 of each interface 32.

After a start step 1000, the interface control circuit 324 receive at a step 1002 one or more first data packets. As mentioned before, the circuit receives data via the register TxFIFO_PUSH. Optionally, the interface control circuit 324 may send at the step 1002 a data read request via the DMA interface 300 to the DMA controller 108, which in return stores the received data to the register TxFIFO_PUSH. Generally, for generating the DMA read requests, the interface control circuit 324 may monitor the fill status of the respective transmission FIFO 320.

Next, at a step 1004, the interface control circuit 324 stores the received one or more first data packets to the respective transmission FIFO memory 320, i.e. the data packets are transferred from the register TxFIFO_PUSH to the write interface of the FIFO 320.

Once data are stored to the transmission FIFO 320, the interface control circuit 324 sequentially reads (via the read interface of the transmission FIFO 320) at a step 1006 the one or more first data packets from the transmission FIFO memory 320 and extracts from the one or more first data packets at least one transmission data word DATA and optionally also the word command CMD.

Accordingly, at an optional verification step 1008, the interface control circuit 324 may verify whether the transmission is enabled, e.g., as a function of the hardware or software trigger. For example, in case the transmission is disabled (output "N" of the verification step 1008), the interface control circuit 324 returns to the step 1008. Conversely, in case the transmission is enabled (output "Y" of the verification step 1008), the interface control circuit 324 proceeds to a step 1010. Generally, this step is purely optional, because the transmission of data may always be enabled.

At the step 1010, the interface control circuit 326 provides the at least one extracted transmission data word DATA to the arbiter 34. As mentioned before, the arbiter 34 selects which of the data words provided by the interfaces 32 has to be transmitted, e.g., based on a priority associated with the data, and provides the selected data word (or sequence of data words) to the hardware SPI interface 36.

Accordingly, at a given time, the hardware SPI interface 36 transmits the at least one transmission data word DATA. For this purpose, the hardware SPI interface 36 may comprise one or more shift registers 360 configured to generate a first serial data signal SOUT as a function of a transmission data word DATA and generates a reception data word RXDATA by sampling a second serial data signal SIN. Moreover, the hardware SPI interface 36 may comprise also a control circuit 362 configured to generate a clock signal SCK for the one or more shift registers 360. As mentioned before, the parameters for the transmission may be specified via the global registers REGG, the respective individual registers REG0 . . . REGn and/or the command CMD. Thus, in general, while being preferable, the command field is purely optional because fixed transmission attributes TAC could also be defined (globally) for each interface 32.

Accordingly, once the hardware SPI interface 36 has transmitted the at least one transmission data word DATA and received the reception data word RXDATA, the hardware SPI interface 36 provides the reception data word RXDATA to the arbiter 34, i.e. the arbiter 34 receives the reception data word RXDATA from the hardware SPI communication interface 36 and forwards the reception data word RXDATA to the interface 32 associated with the transmitted at least one transmission data word DATA.

Accordingly, at a step 1012, the interface control circuit 326 receives from the arbiter 34 the reception data word (RXDATA).

Next, the interface control circuit 326 stores at a step 1014 via the write interface of the reception FIFO 322 one or more second data packets to the reception FIFO memory 322, wherein the one or more second data packets comprise the received reception data word RXDATA.

Accordingly, once data are available, the interface control circuit 326 may transmit sequentially at a step 1016 the one or more second data packets stored to the reception FIFO memory 322. As mentioned before, the circuit 326 may read via the read interface of the reception FIFO 322 at least one second data packets from the reception FIFO 322 and transfer the at least one second data packet to the register RxFIFO_PULL. Next, the interface control circuit 326 may transmit the at least one second data packet stored to the register RxFIFO_PULL, e.g.:

in response to a read request to the register RxFIFO_PULL; or by sending a data write request via the DMA interface 300 to the DMA controller 108.

Once the transmission/reception of data is completed, the interface control circuit 326 may return to the step 1002 for transmitting a new request.

Generally, while shown in FIG. 42 as sequential operations, indeed various steps may be executed in parallel, e.g., via respective hardware sub-circuit, such as:

the steps 1002 and 1004 relating to the operation of the write interface of the FIFO 320;

the steps 1006-1014 relating to the operation of the read interface of the FIFO 320 and the write interface of the FIFO 322; and the step 1016 relating to the operation of the read interface of the FIFO 322.

As mentioned before, when plural queues request the transmission of a respective frame or sequence of frames (in BURST mode), the arbiter 34 has to decide which frame is transmitted first.

For example, as mentioned before, in various embodiments, the transmission of a frame may be requested (e.g., selectively) directly based on the command field CMD, a software trigger or a hardware trigger.

Accordingly, in various embodiments, the arbiter 34 is configured to determine the queues having requested a transmission of data. In various embodiments, the priority of a transmission request is based on the priority set for a given interface 32 as specified in the field PRIORITY of the respective register Q_SETUP. However, as mentioned before, the priority could also be specified directly in the command field CMD.

For example, in various embodiments, once having determined the priority associated with a given transmission request, the arbiter 34 is configured to select the transmission request with the highest priority, e.g., with the highest (or alternatively the lowest) value.

Accordingly, the arbiter 34 connects the transmission queue 320 and the reception queue 322 of the respective interface 32 to the hardware SPI communication interface, which thus initiates the transmission of data based on the global configuration, the respective individual configuration and optionally the configuration stored to the command field CMD.

In this respect, as described in the foregoing, in case a plurality of frames is stored to a given transmission FIFO 320, the burst mode flag BURST_MODE_EN may specify whether the transmission of the sequence of frames may be interrupted by the transmission of another frame with higher priority. For example, in various embodiments the arbiter 34 is configured to interrupt the transmission of frames of a sequence of frames and transmit one or more frames with higher priority, when one of the following conditions is satisfied:

BURST_MODE_EN=0 AND CONT_PCS=0

BURST_MODE_EN=0 AND (CONT_PCS=1 AND DTC>0 AND DEASSERT_PCS_AFTER_DTC=1).

As schematically shown in FIG. 13, in various embodiments, one or more of the interfaces $32_0 \ldots 32_n$ may also comprise an auxiliary reception queue 330 (in addition to the reception queue 322). For example, in various embodiments, the auxiliary reception queue 330 is provided only for the interface $32_0$, which is also the interface used when the SPI interface 30a is operated in the slave mode. For example, in various embodiments, the queue configuration register may comprise a flag specifying whether received data should be stored to the reception FIFO 320 and/or the auxiliary reception queue 330. This auxiliary reception queue 330, such as a further FIFO memory, may be useful in order to provide the respective data via a signal AuxData directly to another hardware circuit of the processing system 10, e.g., via a FIFO read interface, thereby bypassing the DMA interface 300. In this case, the auxiliary reception queue 330 may have associated the corresponding configuration data as the reception FIFO 322, such as at least one of: a threshold value (AuxFIFO_THRESHOLD), a field indicating the locations of the FIFO (AuxFIFO_DEPTH), respective interrupt enable flags (AUXFIFO_OVERRUN_IRQ_EN, AUXFIFO_UNDERRUN_IRQ_EN, AUXFIFO_FULL_IRQ_EN, AUXFIFO_EMPTY_IRQ_EN, AUXFIFO_THRESH_IRQ_EN), interrupt flags (AUXFIFO_OVERRUN_ERR, AUXFIFO_UNDERRUN_ERR, AUXFIFO_UNDERRUN_ERR, AUXFIFO_EMPTY, AUXFIFO_THRESH) and debug registers.

Accordingly, the present disclosure relates to various aspects, which provide improvements over know SPI interfaces, which may be used separately or in combination.

Generally, the SPI circuit 30a of the present disclosure may be used with any digital processing circuit 102, and preferably a digital processing circuit 102 programmable as a function of a firmware stored to a non-volatile memory 104, such as a microprocessor.

In various embodiments, the SPI circuit 30a comprises a hardware SPI communication interface 36, an arbiter 34 and plurality of interface circuits $32_0 \ldots 32_n$.

In various embodiments, the hardware SPI communication interface 36 comprises one or more shift registers 360 configured to generate a first serial data signal SOUT as a function of a transmission data word DATA and a reception data word RXDATA by sampling a second serial data signal SIN. The hardware SPI communication interface 36 comprises also a control circuit 362 configured to generate a clock signal SCK for the one or more shift registers 360.

In various embodiments, the arbiter 34 is configured to provide the transmission data word DATA to the hardware SPI communication interface 36 and receive the reception data word RXDATA from the hardware SPI communication interface 36.

In various embodiments, each interface circuit $32_0 \ldots 32_n$ comprises a transmission FIFO memory 320, a reception FIFO memory 322 and an interface control circuit 324. Specifically, in various embodiments, the interface control circuit 324 is configured to receive one or more first data packets from the digital processing circuit 102, and store the received one or more first data packets to the transmission FIFO memory 320. Next, the interface control circuit 324 sequentially reads the one or more first data packets from the transmission FIFO memory 320, extracts from the one or more first data packets at least one transmission data word DATA, and provides the at least one extracted transmission data word DATA to the arbiter 34. In turn, the interface control circuit 324 receives from the arbiter 34 the reception data word RXDATA, and stores one or more second data packets to the reception FIFO memory 322, wherein the one or more second data packets comprise the received reception data word RXDATA. Finally, the interface control circuit 324 sequentially reads the one or more second data packets from the reception FIFO memory 322, and transmit the one or more (read) second data packets to the digital processing circuit 102.

According to a first aspect of the present disclosure, the interface control circuit 324 does not extract only at least one transmission data word DATA from the one or more first data packets, but also a command CMD. Specifically, in various embodiments, this command indicates the properties of the SPI communication to be used for transmitting the at least one transmission data word DATA. More specifically, in various embodiments, the command comprises a reference to one of a plurality of configurable transmission attributes TAC.

According to a second aspect of the present disclosure, the SPI circuit 30a comprises a plurality of configuration registers, wherein global registers REGG are used to configure the hardware SPI communication interface 36 and/or the arbiter 34, and individual registers REG0 ... REGn are used to configure each interface circuit $32_0 \ldots 32_n$. In various embodiments, the processing system is configured to limit access to these registers via a hardware and/or software memory accesso controller.

According to a third aspect of the present disclosure, the processing system 10 comprises a memory 104 (or 104b) connected to the digital processing unit 102, and a DMA controller 108 configured to read data from the memory 104 as a function of a data read request received via a first DMA channel DMA_Tx and to store data to the memory 104 as a function of a data write request received via a second DMA channel DMA_Rx. In this case, the SPI circuit 30a may comprises a DMA interface 300 configured to communicate with the DMA controller 108. Moreover, the interface control circuit 324 may be configured to receive the one or more first data packets by sending a data read request via the DMA interface 300 to the DMA controller 108, and to transmit the one or more second data packets by sending the data write request via the DMA interface 300 to the DMA controller 108. Accordingly, in this case, the digital processing unit 102 may exchange data with the SPI circuit 30a indirectly via the memory 104 (or 104b). In various embodiments, the processing system 10 is configured to limit access to the memory areas arranged to store the first data packets and the second data packets via a hardware and/or software memory accesso controller.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A processing system comprising:
   a digital processing circuit programmable as a function of a firmware stored in a non-volatile memory; and
   a Serial Peripheral Interface (SPI) circuit comprising:
      a hardware SPI communication interface comprising:
         one or more shift registers configured to generate a first serial data signal as a function of a transmission data word and a reception data word by sampling a second serial data signal; and
         a first control circuit configured to generate a clock signal for the one or more shift registers;
      an arbiter configured to provide the transmission data word to the hardware SPI communication interface and receive the reception data word from the hardware SPI communication interface; and
      a plurality of interface circuits, wherein each interface circuit comprises a transmission first-in-first-out (FIFO) memory, a reception FIFO memory, and an interface control circuit configured to:
         receive one or more first data packets from the digital processing circuit;
         store the received one or more first data packets in the transmission FIFO memory;
         sequentially read the one or more first data packets from the transmission FIFO memory;
         extract from the one or more first data packets at least one transmission data word;
         provide the at least one extracted transmission data word to the arbiter;
         receive from the arbiter the reception data word;
         store one or more second data packets in the reception FIFO memory, wherein the one or more second data packets comprise the received reception data word;
         sequentially read the one or more second data packets from the reception FIFO memory; and
         transmit the one or more second data packets to the digital processing circuit.

2. The processing system according to claim 1, wherein the one or more first data packets comprise a command followed by at least one transmission data word, wherein the command comprises a field for storing data indicating a data transfer count identifying a number of transmission data words following the command, and wherein the interface control circuit is configured to:
  extract the command from the one or more first data packets;
  determine the data transfer count;
  extract from the one or more first data packets the number of transmission data words as indicated by the data transfer count; and
  provide the extracted transmission data words to the arbiter.

3. The processing system according to claim 2, wherein the interface control circuit is configured to generate a plurality of slave select signals, and wherein the command comprises data indicating which slave select signal should be set during transmission of the respective transmission data words.

4. The processing system according to claim 2, wherein the SPI circuit comprises a set of global configuration registers for specifying a plurality of transmission attribute items, wherein each transmission attribute item comprises a respective field for storing the data transfer count, and wherein the command comprises a field indicating one of the transmission attribute items.

5. The processing system according to claim 4, wherein each transmission attribute item comprises one or more fields for storing at least one of:
  data indicating a timing of the clock signal;
  data indicating an inactive state of the clock signal;
  data indicating whether the one or more shift registers generate the first serial data signal and/or sample the second serial data signal in response to a rising or falling edge of the clock signal; or
  data indicating a number of bits of the transmission data word to be transmitted via the first serial data signal.

6. The processing system according to claim 1, wherein each interface circuit comprises a respective set of individual configuration registers, each set of individual configuration registers comprising one or more fields for storing data indicating a priority of the respective extracted transmission data word provided to the arbiter.

7. The processing system according to claim 1, wherein the SPI circuit comprises a set of global configuration registers for configuring the hardware SPI communication interface and/or the arbiter, and wherein each interface circuit comprises a respective set of individual configuration registers for configuring the respective interface circuits, and wherein with the set of global configuration registers and the sets of individual configuration registers are associated respective memory address ranges in the address range of the digital processing circuit, and wherein the processing system is configured to limit access to the memory address ranges for given software tasks executed by the digital processing circuit.

8. The processing system according to claim 7, wherein the digital processing circuit is configured to execute a hypervisor providing a plurality of execution environments, wherein each execution environment is configured to execute a respective operating system, and wherein the hypervisor is configured to limit access to the memory address ranges for the execution environments.

9. The processing system according to claim 1, further comprising a first memory connected to the digital processing circuit, and a direct memory access (DMA) controller configured to read data from the first memory as a function of a data read request received via a first DMA channel and to store data to the first memory as a function of a data write request received via a second DMA channel, and wherein the SPI circuit further comprises a DMA interface configured to communicate with the DMA controller, and wherein the interface control circuit of at least one interface circuit is configured to:
  receive the one or more first data packets by sending a data read request via the DMA interface to the DMA controller, and
  transmit the one or more second data packets by sending a data write request via the DMA interface to the DMA controller.

10. The processing system according to claim 9, wherein the at least one interface circuit comprises a respective set of individual configuration registers for configuring a first threshold of free entries in the transmission FIFO memory and a second threshold of filled entries in the reception FIFO memory, and wherein the interface control circuit of the at least one interface circuit is configured to:
  determine whether a number of free entries in the transmission FIFO memory exceeds the first threshold, and send the data read request via the DMA interface to the DMA controller when the number of free entries in the transmission FIFO memory exceeds the first threshold; and
  determine whether a number of filled entries in the reception FIFO memory exceeds the second threshold, and send the data write request via the DMA interface to the DMA controller when the number of filled entries in the reception FIFO memory exceeds the second threshold.

11. The processing system according to claim 1, wherein the processing system is disposed on an integrated circuit.

12. A device comprising:
a Serial Peripheral Interface (SPI) slave device; and
a processing system configured to exchange data with the SPI slave device via an SPI circuit, the processing system comprising:
  a digital processing circuit programmable as a function of a firmware stored in a non-volatile memory; and
  the SPI circuit, comprising:
    a hardware SPI communication interface comprising:
      one or more shift registers configured to generate a first serial data signal as a function of a transmission data word and a reception data word by sampling a second serial data signal; and
      a first control circuit configured to generate a clock signal for the one or more shift registers;
    an arbiter configured to provide the transmission data word to the hardware SPI communication interface and receive the reception data word from the hardware SPI communication interface;
    a plurality of interface circuits, wherein each interface circuit comprises a transmission first-in-first-out (FIFO) memory, a reception FIFO memory, and an interface control circuit configured to:
      receive one or more first data packets from the digital processing circuit;
      store the received one or more first data packets in the transmission FIFO memory;
      sequentially read the one or more first data packets from the transmission FIFO memory;
      extract from the one or more first data packets at least one transmission data word;
      provide the at least one extracted transmission data word to the arbiter;
      receive from the arbiter the reception data word;

store one or more second data packets in the reception FIFO memory, wherein the one or more second data packets comprise the received reception data word;

sequentially read the one or more second data packets from the reception FIFO memory; and transmit the one or more second data packets to the digital processing circuit.

13. The device according to claim 12, wherein the device is a vehicle.

14. The device according to claim 12, wherein each interface circuit comprises a respective set of individual configuration registers, each set of individual configuration registers comprising one or more fields for storing data indicating a priority of the respective extracted transmission data word provided to the arbiter.

15. The device according to claim 12, wherein the SPI circuit comprises a set of global configuration registers for configuring the hardware SPI communication interface and/or the arbiter, and wherein each interface circuit comprises a respective set of individual configuration registers for configuring the respective interface circuits, and wherein with the set of global configuration registers and the sets of individual configuration registers are associated respective memory address ranges in the address range of the digital processing circuit, and wherein the processing system is configured to limit access to the memory address ranges for given software tasks executed by the digital processing circuit.

16. A method of operating a processing system, the processing system comprising a digital processing circuit programmable as a function of a firmware stored in a non-volatile memory, and a Serial Peripheral Interface (SPI) circuit comprising a hardware SPI communication interface comprising one or more shift registers configured to generate a first serial data signal as a function of a transmission data word and a reception data word by sampling a second serial data signal, and a first control circuit configured to generate a clock signal for the one or more shift registers, an arbiter configured to provide the transmission data word to the hardware SPI communication interface and receive the reception data word from the hardware SPI communication interface, and a plurality of interface circuits, each interface circuit comprising a transmission first-in-first-out (FIFO) memory, a reception FIFO memory, and an interface control circuit, the method comprising:

receiving one or more first data packets from the digital processing circuit;

storing the received one or more first data packets to the transmission FIFO memory;

sequentially reading the one or more first data packets from the transmission FIFO memory;

extracting from the one or more first data packets at least one transmission data word;

providing the at least one extracted transmission data word to the arbiter;

receiving from the arbiter the reception data word;

storing one or more second data packets to the reception FIFO memory, the one or more second data packets comprising the received reception data word;

sequentially reading the one or more second data packets from the reception FIFO memory; and transmitting the one or more second data packets to the digital processing circuit.

17. The method according to claim 16, wherein the one or more first data packets comprise a command followed by at least one transmission data word, the command comprises a field for storing data indicating a data transfer count identifying a number of transmission data words following the command, and the method further comprises:

extracting the command from the one or more first data packets;

determining the data transfer count;

extracting from the one or more first data packets the number of transmission data words as indicated by the data transfer count; and providing the extracted transmission data words to the arbiter.

18. The method according to claim 17, further comprising generating a plurality of slave select signals, the command comprising data indicating which slave select signal should be set during transmission of the respective transmission data words.

19. The method according to claim 16, wherein the processing system further comprises a first memory connected to the digital processing circuit, and a direct memory access (DMA) controller configured to read data from the first memory as a function of a data read request received via a first DMA channel and to store data to the first memory as a function of a data write request received via a second DMA channel, the SPI circuit further comprises a DMA interface configured to communicate with the DMA controller, and the method further comprises, for at least one interface circuit:

receiving the one or more first data packets by sending a data read request via the DMA interface to the DMA controller, and transmitting the one or more second data packets by sending a data write request via the DMA interface to the DMA controller.

20. The method according to claim 19, wherein the at least one interface circuit comprises a respective set of individual configuration registers for configuring a first threshold of free entries in the transmission FIFO memory and a second threshold of filled entries in the reception FIFO memory, and the method further comprises:

determining whether a number of free entries in the transmission FIFO memory exceeds the first threshold, and sending the data read request via the DMA interface to the DMA controller in response to the number of free entries in the transmission FIFO memory exceeding the first threshold; and determining whether a number of filled entries in the reception FIFO memory exceeds the second threshold, and sending the data write request via the DMA interface to the DMA controller in response to the number of filled entries in the reception FIFO memory exceeds the second threshold.

* * * * *